United States Patent
Taki et al.

(10) Patent No.: US 8,019,488 B2
(45) Date of Patent: Sep. 13, 2011

(54) REMOTE OPERATION SYSTEM, REMOTE OPERATION APPARATUS AND SERVICE CENTER

(75) Inventors: Naoki Taki, Okazaki (JP); Atsushi Watanabe, Anjo (JP); Mayumi Otsuka, Nagoya (JP); Tatsunori Kato, Nagoya (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 920 days.

(21) Appl. No.: 11/885,278

(22) PCT Filed: Jul. 4, 2006

(86) PCT No.: PCT/JP2006/313641
§ 371 (c)(1),
(2), (4) Date: Aug. 29, 2007

(87) PCT Pub. No.: WO2007/007696
PCT Pub. Date: Jan. 18, 2007

(65) Prior Publication Data
US 2008/0172147 A1    Jul. 17, 2008

(30) Foreign Application Priority Data

Jul. 7, 2005 (JP) .............................. 2005-199194
Jan. 24, 2006 (JP) .............................. 2006-015100

(51) Int. Cl.
*G05D 1/00* (2006.01)
(52) U.S. Cl. ........................................................ 701/2
(58) Field of Classification Search ........ 701/2; 455/99, 455/556.1; 340/425.5, 426.13
See application file for complete search history.

(56) References Cited

U.S. PATENT DOCUMENTS

2001/0020893 A1* 9/2001 Kawai et al. ............... 340/425.5
2005/0060067 A1* 3/2005 Nishida ............................ 701/2

FOREIGN PATENT DOCUMENTS

| DE | 102 25 787 | | 12/2003 |
|---|---|---|---|
| EP | 1 136 953 | | 9/2001 |
| JP | 9-41754 | | 2/1997 |
| JP | 09-041754 | * | 2/1997 |
| JP | 2001-98812 | | 4/2001 |
| JP | 2002-281166 | | 9/2002 |
| JP | 2003-218651 | | 10/2003 |
| JP | 2004-224067 | | 8/2004 |
| WO | WO 2006/033332 | | 3/2006 |
| WO | WO 2006/075533 | | 7/2006 |
| WO | WO 2006/011274 | | 10/2006 |

OTHER PUBLICATIONS

European Office Action for EP 06 780 914.5 dated Nov. 17, 2009.
International Search Report.
Written Opinion of the International Searching Authority.

* cited by examiner

*Primary Examiner* — Kim T Nguyen
(74) *Attorney, Agent, or Firm* — Finnegan, Henderson, Farabow, Garrett & Dunner, LLP

(57) ABSTRACT

In a remote operation system in which an in-vehicle unit is controlled by an operation command transmitted from a portable unit carried by a driver via a service center, when the vehicle receives an operation command B for controlling the in-vehicle unit from a second state to a first state, the operation command B is executed only when control based on an operation command A for controlling from the first state to the second state is made.

26 Claims, 22 Drawing Sheets

| | OPERATION CONTENTS | ALLOWABILITY REQUIREMENT |
|---|---|---|
| DOOR LOCK CONTROL PART | LOCK | • COMMON PRECONDITION<br>• NO PERSON IN VEHICLE<br>• NO KEY IN VEHICLE |
| | UNLOCK | DEFAULT: NOT ALLOWABLE |
| POWER WINDOW CONTROL PART | CLOSE | • COMMON PRECONDITION<br>• NO PERSON IN VEHICLE<br>• NO KEY IN VEHICLE<br>• ALL DOORS OPENED<br>• WINDOW OF OPERATION SEAT OPENED |
| | OPEN | DEFAULT: NOT ALLOWABLE |
| SUN ROOF CONTROL PART | CLOSE | • COMMON PRECONDITION<br>• NO PERSON IN VEHICLE<br>• NO KEY IN VEHICLE<br>• SUN ROOF OPENED |
| | OPEN | DEFAULT: NOT ALLOWABLE |
| TRUNK OPENING/ CLOSING CONTROL PART | CLOSE | • COMMON PRECONDITION<br>• NO PERSON IN VEHICLE<br>• NO KEY IN VEHICLE<br>• TRUNK OPENED |
| | OPEN | DEFAULT: NOT ALLOWABLE |

| | OPERATION CONTENTS | ALLOWABILITY REQUIREMENT |
|---|---|---|
| DOOR LOCK CONTROL PART | UNLOCK | a) COMMON PRECONDITION<br>b) WITHIN PREDETERMINED TIME PERIOD FROM REMOTE DOOR LOCK OPERATION<br>c) NO LOCAL DOOR LOCK OPERATION<br>d) NONE OF IG AND ACC TURNED ON |
| POWER WINDOW CONTROL PART | OPEN | a) COMMON PRECONDITION<br>b) WITHIN PREDETERMINED TIME PERIOD FROM REMOTE PW OPERATION<br>c) NO LOCAL PW OPERATION<br>d) NONE OF IG AND ACC TURNED ON |

| REMOTE OPERATION NUMBER | DOOR OPERATION TIME | REMOTE/LOCAL | STATE |
|---|---|---|---|
| XXXXXX | 200X/XXXXX/XX XX:XX | REMOTE | DRIVER SEAT LOCKED |
|  | 200X/XXXXX/XX XX:XX | LOCAL | DRIVER SEAT UNLOCKED |
|  | .... | .... | .... |

| REMOTE OPERATION NUMBER | WINDOW OPERATION TIME | REMOTE/LOCAL | STATE |
|---|---|---|---|
| XXXXXX | 200X/XXXXX/XX XX:XX | LOCAL | DRIVER SEAT: 100% OPENED PASSENGER SEAT: CLOSED REAR RIGHT SEAT: 50 % OPENED REAR LEFT SEAT: 20 % OPENED |
|  | 200X/XXXXX/XX XX:XX | REMOTE | ALL SEATS: CLOSED |
|  | .... | .... | .... |

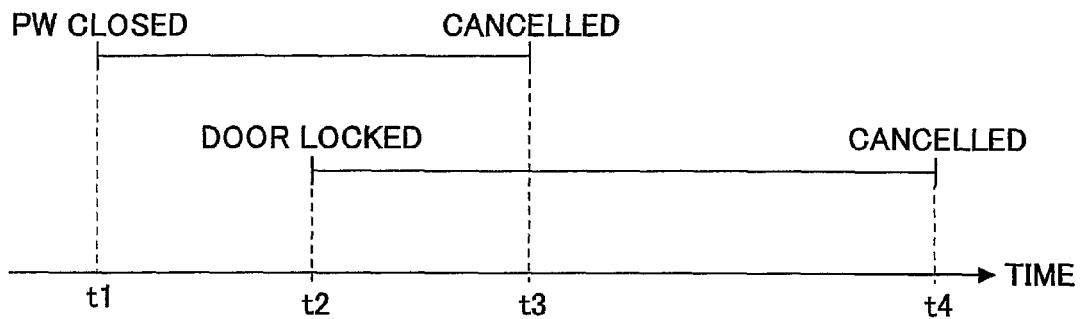

FIG.10

USER ID

DOOR IS LOCKED
CURRENTLY, VEHICLE'S ALL DOORS ARE LOCKED.
REMOTE OPERATION NUMBER: XXXXXX

WHEN THIS OPERATION IS TO BE CANCELLED AND ORIGINAL STATE IS
TO BE RETURNED TO, PLEASE EXECUTE CANCEL OPERATION
FROM THE FOLLOWING URL:

http://www.ty G Guide.com/XXXXXXXX

CURRENTLY, CANCEL OPERATION FOR PW CLOSING IS ALLOWED.
WHEN CANCELING BOTH PW CLOSING AND DOOR LOCKING AND
RETURNING TO ORIGINAL STATES,PLEASE EXECUTE CANCEL
OPERATION FROM THE FOLLOWING URL:

http://www.ty G Guide.com/XXXXXXXX

PLEASE NOTE THAT CANCEL OPERATION CANNOT BE CARRIED OUT
AFTER ELAPSE OF 24 HOURS.

FIG.19

```
┌─────────────────────────────────────────┐
│           CANCEL OPERATION              │
│ - - - - - - - - - - - - - - - - - - - - │
│                                         │
│            XXXXX XX, 200X               │
│          12:10 PRESENT TIME             │
│                                         │
│                                         │
│         STOPPED LOCATION:               │
│         XX PREFECTURE, XX CITY, XX-XX   │
│                                         │
│                                         │
│         CURRENTLY, THERE IS NO          │
│         CANCELABLE ITEM                 │
│                                         │
└─────────────────────────────────────────┘
```

CANCEL OPERATION

XXXXX XX, 200X
12:10 PRESENT TIME

STOPPED LOCATION:
XX PREFECTURE, XX CITY, XX-XX

WINDOW CLOSE
CANCEL

OPERATION DATE/TIME:
XXXXX XX, 200X
8:50

OPERATION RESULT

'NOTIFICATION FOR VEHICLE REMOTE
OPERATION RESULT IS UNUSUAL.
PLEASE CHECK VEHICLE CONDITION.'

REMOTE OPERATION SYSTEM, REMOTE OPERATION APPARATUS AND SERVICE CENTER

TECHNICAL FIELD

The present invention relates to a remote operation system and a remote operation apparatus, and, in particular, to a remote operation system and a remote operation apparatus by which cancellation of remote operation can be made.

BACKGROUND ART

A vehicle for which remote operation of an in-vehicle unit from a remote location is allowed is known (see Japanese Laid-open Patent Application No. 2004-224067). In the vehicle for which remote operation is allowed, locking/unlocking of doors or opening/closing of windows of the vehicle is allowed.

DISCLOSURE OF THE INVENTION

Since remote operation is carried out from a remote location from the vehicle by a driver, such a sort of remote operation which may degrade the vehicle's security should be inhibited. Since remote operation is carried out via a server, if such a sort of remote operation as that of unlocking the door, or such, which degrades security, is allowed uniformly, a person who illegally invades the server may unlock all the vehicle doors for which remote operation is allowed. In order to solve this problem, a setting is made in the server or the vehicle such that remote operation of door unlocking, window opening operation, and so forth, is not allowed in many cases.

However, there is a case where operation should be cancelled after the in-vehicle unit is remotely controlled. For example, this is a case where, after the control is made to lock the door, the door should be unlocked since a person is detected in the vehicle. In such a case, in order to avoid the person from being locked in the vehicle, it is preferable to unlock the door, and, it is preferable that unlocking is allowed in a predetermined condition, even in remote operation in which such operation is inhibited in principle.

The present invention has been devised in consideration of the above-mentioned situation, and an object of the present invention is to provide a remote operation system, a remote operation apparatus and a service center by which, with ensuring security, cancellation of remote control is allowed.

According to the present invention, in order to solve the above-mentioned problem, in a remote operation system in which an in-vehicle unit is controlled by an operation command transmitted from a portable unit carried by a driver via a service center, when the vehicle receives an operation command B for controlling the in-vehicle unit from a second state to a first state, the operation command B is executed only when control based on an operation command A for controlling from the first state to the second state is made before the operation command B.

In this configuration, a remote operation system in which, with ensuring security, cancellation of remote operation is allowed, can be provided.

According to another aspect of the present invention, the vehicle has a remote operation response generating part which generates an operation completion notification after controlling the in-vehicle unit based on the operation command A, and transmits the same to the service center. The remote operation response generating part transmits a cancel operation completion notification when the in-vehicle unit is controlled based on the operation command B and a state before the operation command A is returned to.

In this configuration, the user can know the operation result by reading the operation completion notification or the cancel completion notification.

According to further another aspect of the present invention, the operation completion notification includes guiding information for guiding a user such that the in-vehicle unit is retuned to the state before the control of the operation command A.

In this configuration, the user can execute cancel operation easily by the use of the guiding information. The guiding information is, for example, a URL or such for carrying out the cancel operation.

According to further another aspect of the present invention, when the vehicle has a control record of the in-vehicle unit based on the operation command A, it returns the in-vehicle unit into the state before the operation command A based on the operation command B.

In this configuration, since cancel operation is not allowed when no control record exists, such remote operation as that, even when illegal access to the service center occurs, degrading security can be avoided.

According to further another aspect of the present invention, after the control of the in-vehicle unit based on the operation command A, the vehicle returns the in-vehicle unit into the state before the operation command A based on the operation command B only during a predetermined time period.

In the configuration, since cancel operation is allowed from remote operation only within a predetermined time period, degradation in security can be avoided.

According to further another aspect of the present invention, when the vehicle is locally controlled after the control of the in-vehicle unit based on the operation command A, the vehicle inhibits returning of the in-vehicle unit into the state before the operation command A based on the operation command B.

In this configuration, since direct operation on the vehicle by the user is allowed when the user is allowed to directly operate the vehicle, cancel operation can be limited. It is noted that 'local operation' means operation other than the remote operation.

According to further another aspect of the present invention, the vehicle has a flag for determining whether or not the state before the operation command A is to be returned to when the operation command B is received; and the flag comes to have an allowable state when the in-vehicle unit of the vehicle is controlled based on the operation command A, and comes to have a not allowable state when the vehicle is locally controlled or a predetermined time period has elapsed from the control of the in-vehicle unit based on the operation command A.

In this configuration, when the vehicle receives a cancel operation command, the original state before the operation command can be retuned to based on the flag.

According to further another aspect of the present invention, the vehicle has a remote operation response generating part which transmits the flag together with the operation completion notification after controlling the in-vehicle unit based on the operation command A; the remote operation response generating part transmits the flag together with the cancel operation completion notification when controlling the in-vehicle unit based on the operation command B and returns it to the state before the operation command A; and the service center determines whether or not accepting the operation command B based on the state of the flag transmitted from the vehicle.

In this configuration, whether or not the state before operation command is to be returned to can be determined based on the flag which indicates the vehicle state.

According to further another aspect of the present invention, the service center dispatches a cancel operation menu page from which the operation command B is selectable to the portable unit when the flag has the allowable state; and the service center dispatches a cancel operation menu not displaying page from which the operation command B is not selectable to the portable unit when the flag has the not allowable state.

In this configuration, a page transmitted to the portable unit can be controlled based on the flag's state.

According to further another aspect of the present invention, the service center updates the flag of the service center into the allowable state when it cannot properly receive the operation completion notification from the vehicle after transmitting the operation command B.

In this configuration, even when the operation completion notification cannot be received due to communication error, time out or such, a possibility that the cancel operation is accepted can be increased since the flag is set in the allowable state.

According to further another aspect of the present invention, the service center dispatches the cancel operation menu page to the portable unit when the flag of the vehicle is inverted into the not allowable state after the flag in the allowable state is transmitted from the vehicle.

In this configuration, since the flag in the service center is kept in the allowable state even when the vehicle is locally operated, the cancel operation menu page for accepting the cancel operation command can be displayed to the user, and thus, a system which the user can easily understand can be achieved.

According to further another aspect of the present invention, the service center updates the flag into the not allowable state when a predetermined time period has elapsed from when the flag comes to have the allowable state.

In this configuration, the service center can update the flag's state in response to the elapse of a time, and can determine whether or not the cancel operation is to be accepted.

According to further another aspect of the present invention, the service center transmits the operation command B to the vehicle even when the flag has the not allowable state, after dispatching the cancel operation menu page, in a case where the operation command B from the portable unit is received by the service center after the predetermined time period has elapsed.

In this configuration, after the cancel operation command is transmitted from the cancel operation menu page by the user, the cancel operation can be accepted, and thus, the user's complaint can be avoided.

Thus, according to the present invention, it is possible to provide a remote operation system, a remote operation apparatus and a service center by which, with ensuring security, cancellation of remote control is allowed.

BRIEF DESCRIPTION OF DRAWINGS

Other objects and further features of the present invention will become more apparent from the following detailed description when read in conjunction with the accompanying drawings:

FIG. 4 shows one example of an allowability determination table;

FIG. 5 shows one example of a cancel operation determination table;

FIG. 6 shows one example of the vehicle's states stored in a vehicle state storage part;

FIG. 9 shows a relationship between remote operation and cancel operation;

FIG. 10 shows one example of operation completion notification;

FIG. 19 shows one example of a cancel operation acceptance not allowable page displayed on the portable unit;

FIG. 23 shows one example of an electronic mail or such for an operation completion notification reception uncertain state.

BEST MODE FOR CARRYING OUT THE PRESENT INVENTION

Below, a best mode for carrying out the present invention is described, with reference to figures.

First, a first embodiment of the present invention is described.

Figure 1:
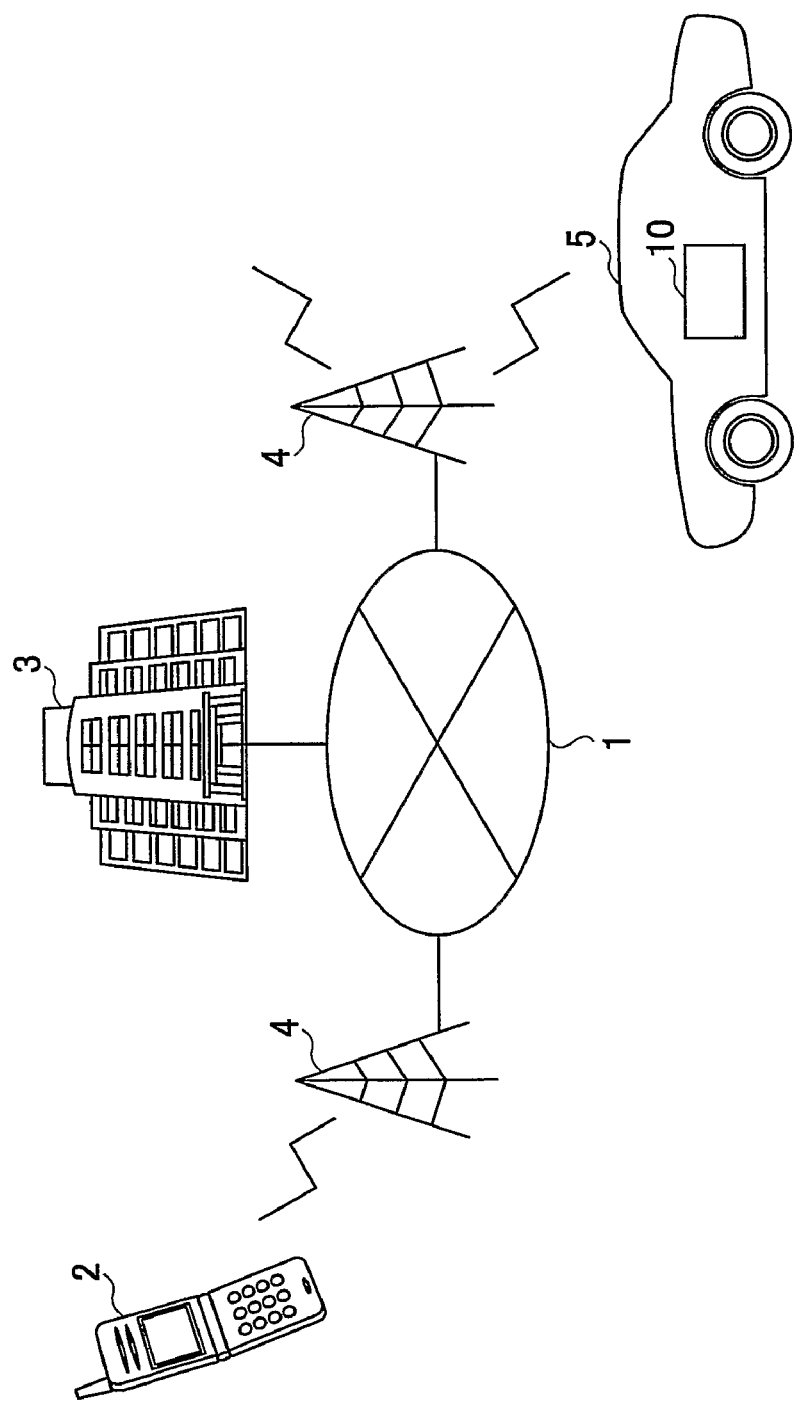
FIG. 1 shows an entire configuration of a remote operation system in which a remote operation apparatus is applied to a vehicle.
Figure 2:
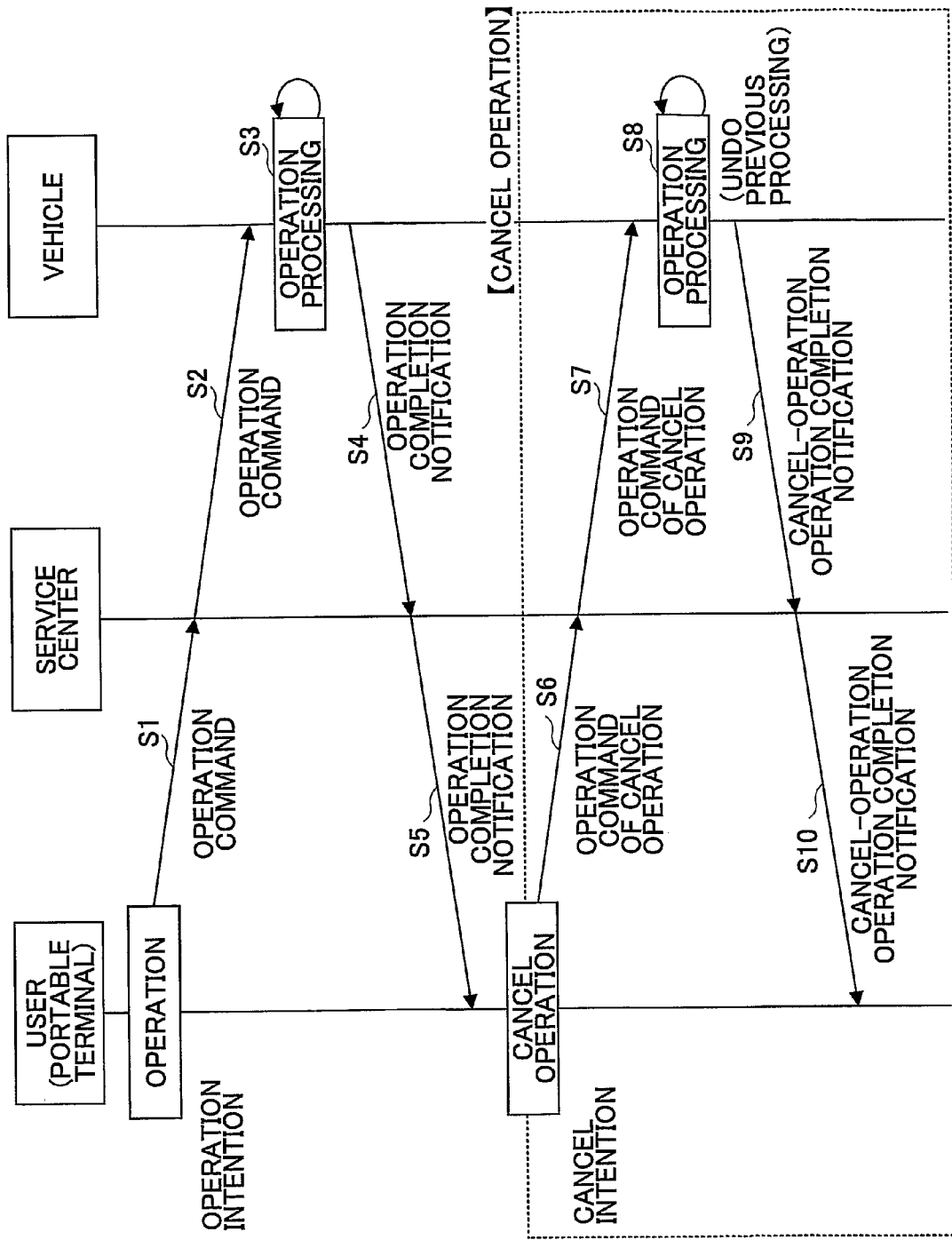
FIG. 2 shows an example of a sequence of a flow of processing of the remote operation system.

FIG. 1 shows an entire system configuration of a remote operation system in which a remote operation apparatus 10 is applied to a vehicle. FIG. 2 shows one example of a sequence diagram of a flow of processing of the remote operation system.

In the remote operation of FIG. 1, via a communication network 1 such as the Internet, a portable unit 2, a service center 3 and a vehicle 5 are connected together. The portable unit 2 and the vehicle 5 can be connected to the network 1 via a relay station 4 with the use of mobile communication network or radio LAN. Further, the service center 3 can be connected to the network 1 with the use of wired or radio communication.

When a user inputs an operation command by operation of the portable unit 2, the operation command is transmitted to the vehicle 5 via the service center 3 (S1, S2 of FIG. 2), and the remote operation apparatus 10 in the vehicle 5 controls an in-vehicle unit according to the operation command (S3). An operation completion notification is transmitted to the portable unit 2 via the service center 3 from the vehicle 2 (S4, S5). It is noted that the user means a person who is registered in the service center 3 and has a right to remotely control the vehicle 5, who is, for example, an owner of the vehicle 5.

When the user wishes cancellation of previous remote operation, an operation command for the cancel operation is transmitted to the vehicle 5 (S6, S7) via the service center 3 from predetermined user's operation. The vehicle 5 cancels the remote operation to return into the original one (S8) by reading the in-vehicle unit's control record. Then the vehicle 5 transmits a cancel operation completion notification to the portable unit 2 via the service center 3 (S9, S10).

When the cancel operation such as that shown in FIG. 2 is allowed, the state before the remote operation can be returned to, when an accident such that a person is locked in the vehicle or such occurs as a result of the remote operation of door locking. Thus, convenience in the remote operation system improves.

The portable unit 2 may be one which can be connected to the service center 3 via the communication network, from which operation required by the service center 3 can be carried out, i.e., a cellular phone, a PDA (portable data assistant), a PHS (personal handyphone system), a personal computer or such. For example, in a case of the cellular phone, it uses GSM (global system for mobile communications), TDMA (time division multiple access), CDMA (code division multiple access), PDC (personal digital cellular), or such, to carry out communication. In a case of the personal computer, it uses radio LAN or such to make communication with the relay station 4.

The portable unit 2 has a CPU which controls respective parts; a ROM storing programs such as OS, browser and so forth executed by the CPU; a RAM storing operation results or such; a timer; an input device such as a keyboard; a display part such as a liquid crystal device, organic EL or such; a communication device for connecting to the relay station 4; a microphone; a speaker and so forth. The portable unit 2 may be configured to also act as a vehicle key providing a keyless entry function.

The service center 3 provides various services to the driver between the vehicle 5 and the driver (portable unit 2), and, even when the vehicle 5 and the driver separate from one another by a predetermined distance, the service center 3 notifies the driver of an invasion, engine starting up operation or such made by a third party to the vehicle 5, or allows the driver to remotely operate the vehicle 5.

The service center 3 is a computer including a CPU, a ROM, a RAM, a storage device, a communication device and so forth, and communicates with the portable unit 2 and the vehicle 5 via the network 1. In the ROM or the storage device, an Os, a program and so forth are stored, which may be executed by the CPU so that the service center 3 determines based on a flag described later whether or not cancel operation is to be accepted.

When the user accesses the service center 3 with the use of the portable unit 2, the service center 3 transmits an operation page produced with a language such as HTML (hypertext markup language), XML (extensible markup language) or such. A browser program or such for example of the portable unit 2 displays the operation page on the display part, and thus, the user can make predetermined operation thereto, whereby an operation command according to the thus-given operation is transmitted to the service center 3. The service center 3 transmits the operation command to the remote operation apparatus 10 of the vehicle 5. It is noted that actual operation of inputting the operation command from the portable unit 2 may be made in such a manner that, the user's voice is recognized, and is converted into the operation command, or, a response is made by means of the keyboard or a voice, to a voice guidance transmitted from the service center 3.

Figure 3:
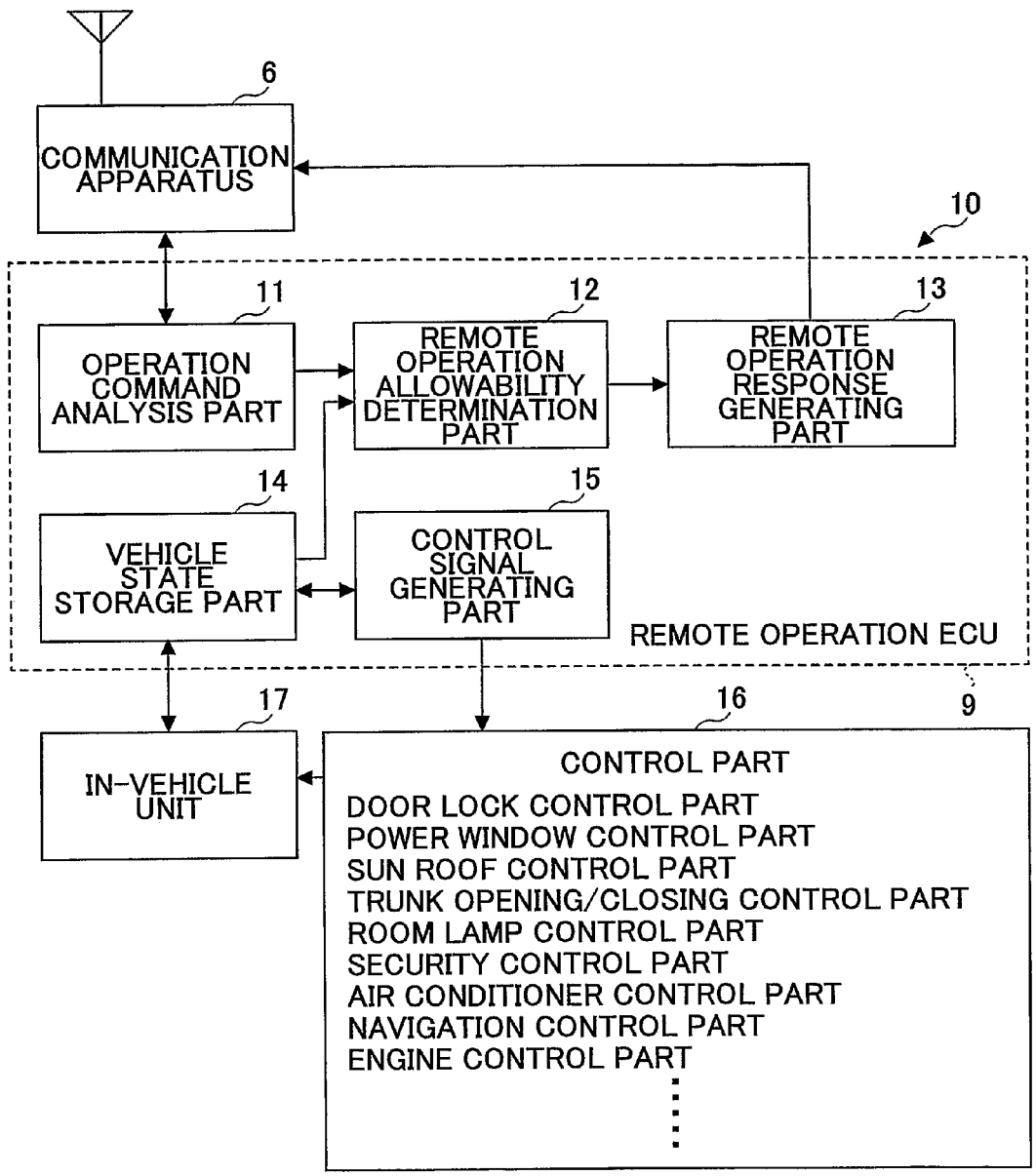
FIG. 3 shows a block diagram of the remote operation apparatus.

The remote operation apparatus 10 which the vehicle 3 has is described next. FIG. 3 shows a block diagram of the remote operation apparatus 10. The remote operation apparatus 10 is controlled by a remote operation ECU 9. The remote operation ECU 9 has a CPU controlling respective parts; a ROM storing a program executed by the CPU; a RAM storing operation results or such; a communication interface for communicating with other ECUs, and so forth.

The remote operation apparatus 10 is configured to have an operation command analysis part 11, a remote operation allowability determination part 12, a remote operation response generating part 13, a vehicle state storage part 14 and a control signal generating part 15. As a result of the CPU carries out the program, these functions are achieved. It is noted that the remote operation apparatus 10 is connected to a communication apparatus 6, an in-vehicle unit 17 and a control part 16 controlling the in-vehicle unit 16, which are mounted in the vehicle 5.

The communication apparatus 6 is connected to the relay station 4 with the use of the mobile communication network. A specific communication method applied there is GSM, TDMA, CDMA, PDC or such when the cellular phone is used. It is also possible that, with the use of radio LAN, the network 1 is directly connected. When connecting to the relay station 4, the communication apparatus 6 receives the operation command transmitted from the service center 3, or, transmits the operation completion notification which is an operation result of the remote operation or a cancel operation completion notification which is an operation result of the cancel operation, described later, to the service center 3.

The operation command analysis part 11 analyzes the operation command sent from the communication apparatus 6, and determines the user's operation contents.

The remote operation allowability determination part 12 determines whether or not the remote operation is allowed. The remote operation allowability determination part 12 has an allowability determination table in which operation allowability is set for each operation command, and determines allowability of the operation, based on the operation command analyzed by the operation command analysis part.

FIG. 4 shows one example of the allowability determination table. For example, for a case of door locking, remote operation of door locking is allowed when the following conditions are met:
  common precondition;
  no person in the vehicle; and
  no key in the vehicle.

When these conditions are met, such an accident that a person is locked in the vehicle or such can be avoided, and thus, safety can be improved. It is noted that the common precondition means a condition that the vehicle is on operation (i.e., the vehicle is actually running, on preparation for running, i.e., the driver actually drives the vehicle).

Further, for such operation as that remote operation may degrade security, i.e., unlocking the door or such, the remote operation allowability determination part 12 in principle does not allow the operation (in default setting). The operation which may degrade security may be selected by the user from an operation page transmitted to the portable unit 2 from the service center 3.

In order to determine operation allowability based on the allowability table, the remote operation allowability determination part 12 is connected to the vehicle state storage part 14, and can detect the vehicle's state. As will be described later, the vehicle's state is such as opened/closed states of the door, the window and the sun roof; locked/unlocked state of the door, engine operation state, or such. The remote operation allowability determination part 12 detects the vehicle's state from the vehicle state storage part 14, and determines whether to not door locking or such is allowed. Similarly, the remote operation allowability determination part 12 makes determination such that remote operation of a security unit is inhibited when the door is opened; starting up of an air conditioner is inhibited based on the engine operation state and the battery power, or such.

Further, when remote operation is cancelled, the remote allowability determination part 12 determines whether or not the cancel operation is allowed based on a cancel operation determination table provided for determining whether or not the cancel operation is allowed, although the cancel operation is in principle inhibited from the allowability table.

FIG. 5 shows one example of the cancel operation determination table. For example, remote opening operation of a power window (PW) is inhibited in principle in the allowability table. However, when remote closing operation is to be cancelled, i.e., when a state before the closing operation is to be returned to, the cancel operation is allowed when the following conditions are met:

a) common precondition;
b) within a predetermined time period (referred to as cancel operation acceptance time, hereinafter) since the remote PW operation;
c) no local PW operation has been made; and
d) neither IG (ignition) nor ACC (accessory) is turned on.

'Local' means that the vehicle is operated not remotely, but directly by a person.

When the above-mentioned items a), b) and d) are not met, this means that the driver or a passenger exits in the vehicle 5, and can operate the vehicle, or have operated the vehicle 5 locally. Accordingly, when the conditions a), b) and d) are not met, it is not necessary to cancel the past operation remotely.

Further, the condition b) 'within the cancel operation acceptance time' requires, for the remote operation cancellation, that a control record of the past remote operation exists, and also, it is within the cancel operation acceptance time since the past remote operation.

By thus requiring the condition of the control record of remote operation, the vehicle 5 can neglect such an operation command of opening PW, which is transmitted to all the vehicles across the country, as a result of the service center 3 being invaded illegally, for example. Thus, security can be ensured.

Further, the condition that 'it is within the cancel operation acceptance time since the remote operation' is thus required, by the following reason: That is, a situation of canceling operation occurs relatively within a short time from when the remote operation was made and the operation completion notification was received. For example, in a case where the windows are closed or the doors are locked while a person exists in the vehicle 5, or the hazard lamps are lit for the purpose of avoiding vehicle crash, the operation should be cancelled immediately after the remote operation or within a short time period. Accordingly, as the condition for allowing the cancel operation, the condition that 'it is within the cancel operation acceptance time' is sufficient, and security is ensured as a result of cancellation being allowed in such a limited condition that it is within the fixed time period.

The cancel operation acceptance time may be determined in any manner. However, the user may not be in a condition in which the user can always check the remote operation's operation completion notification. Accordingly, assuming that, in a life cycle, remote operation in morning is to be cancelled in evening in many cases, the order of 24 hours may be set as a time period which may not cause a disbenefit for a user in many cases.

In the present embodiment, as mentioned above, the vehicle 5 has the remote operation allowability determination part 12, and determines cancel operation allowability based on the cancel operation allowability determination table. The service center 3 may receive the above-mentioned states a), c) or d) of the vehicle 5, and determines the allowability of the cancel operation. However, a situation, in which the service center 5 executes cancel operation even when the cancel operation should not be actually carried out in the vehicle 5, due to communication delay, communication missing or such between the service center 3 and the vehicle 5, should be avoided. Further, as described later, the service center 3 should not excessively avoid cancel operation based on the reason of the acceptance time in the service center 3. For these reasons, the vehicle 5 is one which should preferable determine the allowability of cancel operation.

A time period (referred to as a remote operation acceptance period, hereinafter) within which, remote operation is allowed in the vehicle 5 having elapsed since the vehicle 5 was parked, is defined from a battery capacity. When the vehicle 5 is driven once or twice a week, the remote operation acceptance period should be the order of nine days. Accordingly, when nine days have elapsed since the vehicle 5 was parked, remote operation is not allowed.

When the remote operation acceptance period is set as nine days, and remote operation is carried out after the elapse of eight days and 23 hours for example, the remote operation cannot be cancelled after the elapse of one hour from the remote operation. However, cancel operation is preferable for improving safety, and thus, should not be avoided due to such time period expiration. Therefore, according to the present embodiment, even when the remote operation acceptance period is set in nine days, the remote operation acceptance period, i.e., nine days, is extended only for cancel operation.

For example, when remote PW closing operation is carried out after the elapse of eight days and 23 hours, cancel operation for the closing operation, i.e., cancel operation to return to the original opened state is accepted within nine days and 23 hours (when the cancel operation acceptance time is set in 24 hours). It is noted that after the elapse of nine days, another remote operation (other than cancel operation) is not accepted. Further, when cancel operation is made within nine days and 23 hours, cancel operation for the cancel operation cannot be accepted even within 24 hours. By configuring so, death of the battery, which may occur from infinite cycle of 'remote operation→cancel operation' can be avoided.

Thus, as a result of cancellation of remote operation being allowed, even operation for which remote operation is inhibited according to the allowability determination table in principle can be cancelled by the user after the target remote operation of the in-vehicle unit is made by the user, and the original state can be returned to.

It is noted that, in comparison to the allowability determination table, the limitations of the cancel operation determination table are more moderate. This is because, cancel operation should be executed as long as possible when it is desired, and also, in consideration of the acceptance time period being limited as mentioned above, the determination conditions should be reduced.

Returning to FIG. 3, the control signal generating part 15 generates a control signal for executing operation when the remote operation allowability determination part 12 allows the operation. For example, when the operation command is for the window closing operation, the control signal controlling an actuator for opening/closing the window is generated. The thus-generated control signal is sent to the control part 16 via an in-vehicle LAN of a vehicle body system.

The control part 16 includes a various sorts of ECUs receiving the control signals from the control signal generating part 15, and controlling the respective in-vehicle units 17. The in-vehicle units 17 may include, for example, a door lock control part, a power window control part, a sun roof control part, a trunk control part, a room lamp control part, a security control part, an air conditioner control part, a navigation control part, an engine control part, and so fourth.

The door lock control part 16 drives an actuator for locking/unlocking each door one by one or all the doors. The power window control part drives an actuator for opening/closing each window one by one or all the windows. The sun roof control part drives an actuator for opening/closing or tilting up/down of a sun roof. The trunk control part drives an actuator for opening/closing a trunk.

The room lamp control part controls turning on/off of a room lamp. It is noted that control is made such that, on the occasion of turning on/off, the brightness is gradually increased/decreased, as a result of employing a pulse width modulation system. A head light control part controls turning on/off of head lights, carries out high beam/low beam control, hazard turning on/off control, and so forth.

The security control part controls turning on/off, alarm horn blowing, or such, of the security unit. When the security unit is turned on (alarm state), and opening/closing of the doors, hood, trunk or such, or an invasion of a stranger is detected, alarm blowing is carried out for the vehicle surroundings, by means of operation of an alarm unit, head lights, or such, in an appropriate way. Further, the detection of a stranger may be notified of to the service center 3.

The air conditioner control part carries out air condition control of a vehicle air conditioner mounted in the vehicle 5. The navigation control part controls a navigation unit, measures the current vehicle position, displays the same in a screen of LCD or such, and transmits the same to the portable unit 2 via the service center 3. The engine control part controls starting up/stopping of the engine.

The respective in-vehicle units 17 controlled by the control parts 16 send the states of the vehicle (i.e., the respective in-vehicle units) to the vehicle state storage part 14 for each of the in-vehicle units 17 via the in-vehicle LAN. The vehicle state storage part 14 stores the thus-sent states of the in-vehicle units.

FIG. 6 shows example of the states of the vehicle stored in the vehicle state storage part 14. The vehicle states are stored for the respective in-vehicle units. For the doors, distinction between remote and local, states of the doors, and so fourth, are stored corresponding to actual operation times in a time series manner.

A clock of the vehicle 5 is adjusted in such a manner that the time measurement has a predetermined limited error from a clock which the service center 3 has, periodically or for each remote operation. The operation time is a time at which control of the in-vehicle unit is finished. However, when the in-vehicle unit is controlled remotely, the operation time may be a time at which the service center 3 receives the operation command.

Further, for the case of remote operation, a remote operation number is stored as the vehicle state. The remote operation number is one given for the purpose of the service center 3 being able to identify each particular remote operation, each which is at least one unique within the same vehicle. Accordingly, by reading the remote operation number, it is possible to determine the contents, the operation time of the remote operation and the vehicle state after the operation.

Also for the windows, the same contents, as those for the doors, are stored as the vehicle states. For such in-vehicle units as the doors or the windows that a plurality of ones are provided in the vehicle, the state should be preferably stored for each (i.e., each door or each window). FIG. 6 shows examples in which the respective states of the doors of the driver's seat, passenger's seat and respective right and left rear passengers' seats, are stored.

For the door locking/unlocking states, not only the state of fully opened/closed but also the state of how much it is opened may be stored numerically. Thereby, it is possible to return to the original state precisely when the operation is cancelled.

Figure 7:
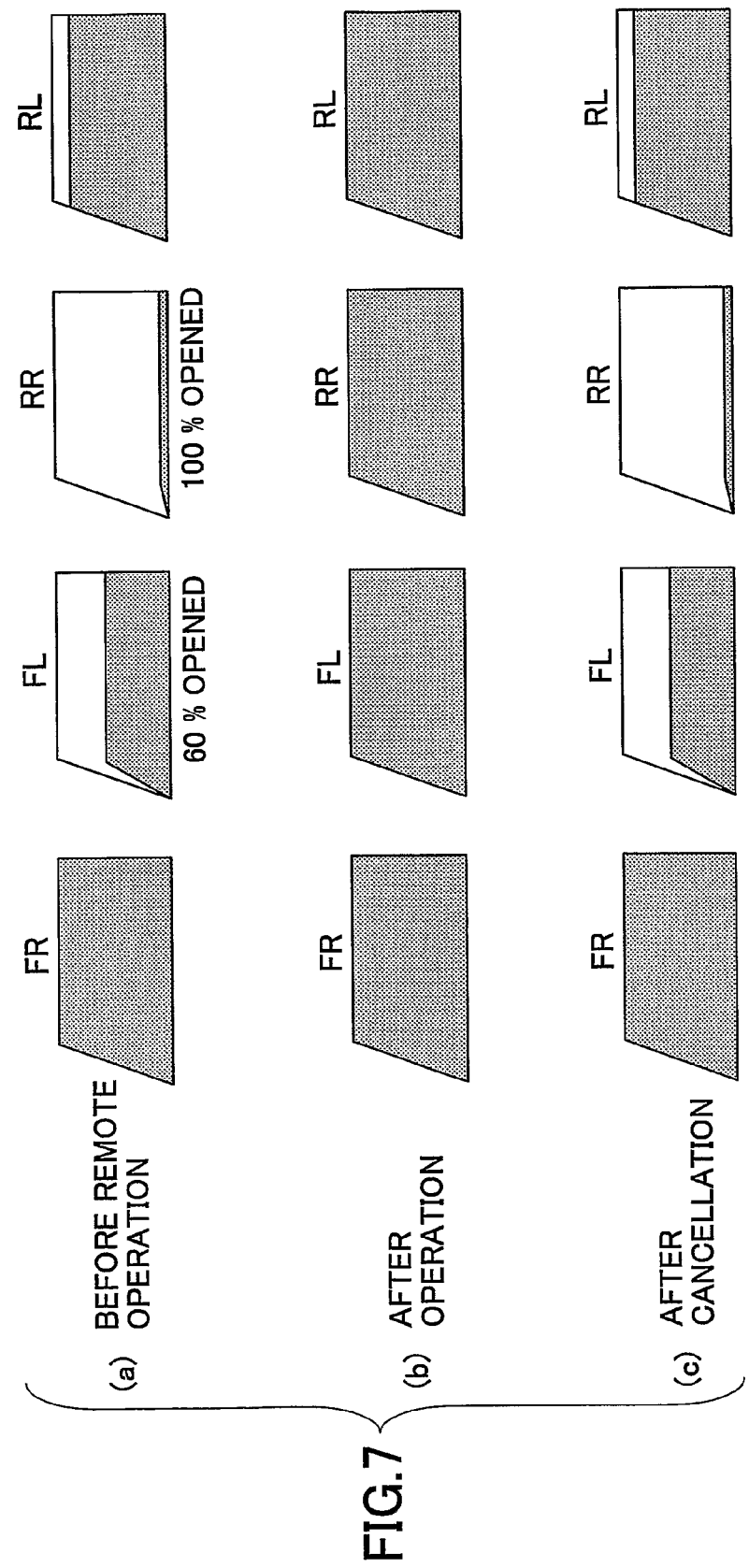
FIG. 7 shows a state of a window.

FIG. 7 shows a state of the window indicated numerically. FIG. 7 (a) shows a state before remote operation; FIG. 7 (b) shows a state of the windows being closed remotely; and FIG. 7 (c) shows a state of the original state (the same as the state of FIG. 7 (a)) being returned to, by means of cancel operation. In FIG. 7, from the left end, the driver's seat FR, passenger's seat FL, rear passenger's seat RR, and rear right passenger's seat RL are shown, respectively.

When a state, in which the window is closed to the top dead center, is called 'closed', and a case where the window is opened from the top dead center is expressed by '20% opened' or such, the opening of the passenger's seat FL is approximately 60%, and the same of the rear right seat RR is approximately 100%. The state after the remoter operation is stored in the vehicle state storage part 14.

When, after the windows are remotely closed, the operation command for canceling this remote operation is received, the control signal generating part 15 reads the vehicle state storage part 14, and returns the respective windows to the original states.

The remote operation response control part 13 generates and transmits the operation completion signal to the portable unit 2 via the service center 3 when the in-vehicle unit 17 is controlled based on the operation command. Further, the remote operation response control part 13 generates and transmits the cancel operation completion notification to the portable unit 2 via the service center 3 when controlling the in-vehicle unit 17 based on cancel operation and returns to the state before the remote operation.

Figure 8:
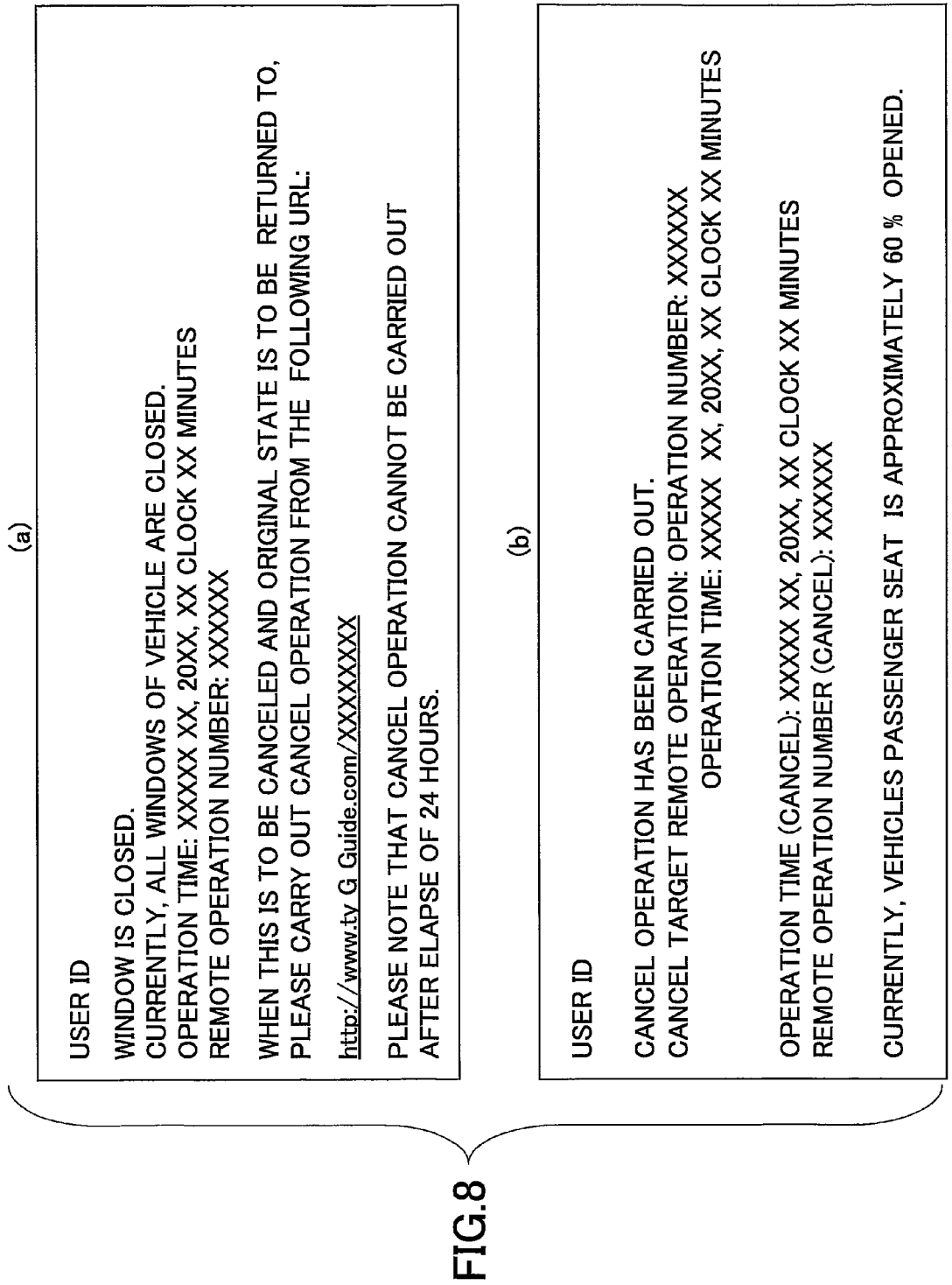
FIG. 8 shows one example of a remote operation's operation completion notification and cancel operation completion notification.

FIG. 8 (a) shows one example of the operation completion notification of remote operation displayed on the portable unit 2, and FIG. 8 (b) shows one example of the cancel operation completion notification. As shown in FIG. 8 (a), the operation completion notification includes, together with a user ID for identifying the user, a state of the windows after the remote operation, operation time, and the remote operation number are displayed. Further, as guiding information for guiding the user for the cancel operation, a URL of a site for the cancel operation of the service center 3 is given. Accordingly, the user who receives the operation completion notification can easily carry out the cancel operation. The remote operation system detects omission of door locking or window closing and notifies the user thereof. Accordingly, the user is guided to an operation cycle of 'operation omission notification→remote operation→cancel operation→re-operation'.

Remote operation is separately managed in such a manner that the remote operation number is given thereto particularly. Accordingly, the cancel operation canceling the remote operation is also carried out separately. FIG. 9 shows relationship between the remote operation and the cancel operation. The user carries out remote operation of closing PW at a time t1, and carries out remote operation of door locking at a time t2. Accordingly, cancel operation for the PW closing operation can be carried out within the cancel operation acceptance time after the time t1. Similarly, cancel operation for the door locking can be carried out within the cancel operation acceptance time after the time t2. Assuming that the cancel operation for the PW closing operation is carried out at a time t3, the remote operation of both the PW closing and door locking can be canceled during a time period of the times t2 through t3.

Accordingly, when the user connects to the site of the service center 3 by means of the URL from the operation completion notification of the PW closing or door locking, the operation page is displayed on the portable unit 2 from which, the cancel operation of the PW closing is selectable for t1 through t2; the cancel operations of both the PW closing and door locking are selectable for t2 through t3; and the cancel operation of the door locking is selectable for t3 through t4.

Further, in a situation in which a plurality of cancel operations are allowed, a manner that all the cancelable operations at the current time are made selectable is convenient for the user. When the door locking is carried out remotely at the time t2, both the PW closing and the door locking can be cancelled during the period of t2 through t3. The service center 3 stores the vehicle's states as in the vehicle 5 itself. Accordingly, the service center 3 can detect that the PW closing is carried out at the time t1 from the past operation history when receiving the door locking operation completion notification from the vehicle 5. Accordingly, the user can carry out the plurality of cancel operations by a single action as a result of the service center 3 providing the operation completion notification such as that shown in FIG. 10 when the service center 3 notifies the user of the door locking operation completion notification. In FIG. 10, notification of operation completion for the separate remote operation (door locking) is shown as in FIG. 8 (*a*), and also, a display is made such that 'currently, cancel operation for the PW closing is allowed. When canceling both the PW closing and the door locking and returning to original states, please execute cancel operation from the following URL'. The user can make the cancel operation of the plurality of remote operations by one action from the URL.

Acceptance start conditions for cancel operation is described now. With reference FIG. 9, description has been made such that cancel operation is allowed from the time t1 or the time t2. The times t1 and t2 are those at which the service center 3 receives the operation command arrival notifications from the vehicle.

Figure 11:
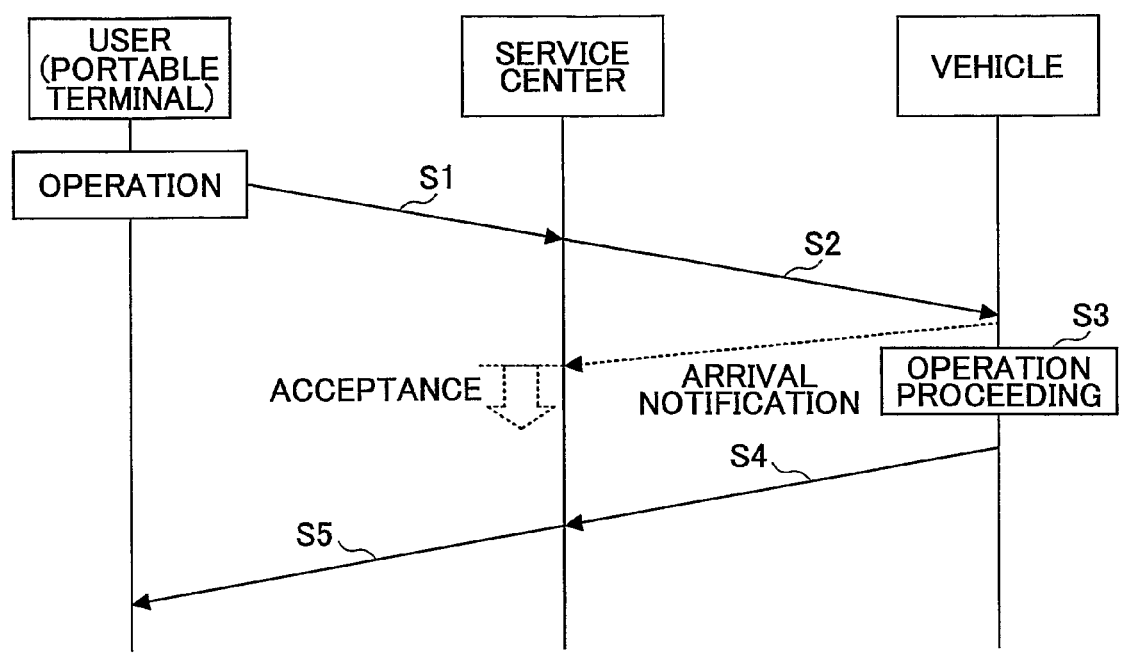
FIG. 11 illustrates cancel operation acceptance start condition.

FIG. 11 illustrates cancel operation acceptance start condition. When the user transmits an operation command to the service center 3 (S1), the service center 3 transmits the operation command to the vehicle 5 (S12). However, the service center 3 may not be able to determine, after the transmission, whether or not the vehicle actually controls the in-vehicle unit 17 according to the remote operation. For example, the vehicle 5 carries out communication via radio. Accordingly, in some case, due to communication trouble or such, the vehicle 5 cannot receive the operation completion notification even when the vehicle 5 actually controls the in-vehicle unit 17. Further, when the control is not allowed after the operation command is transmitted, it cannot be determined whether the control is not allowed because the vehicle 5 cannot properly receive the operation command due to the communication trouble or the control is not allowed according to the allowability determination table. Therefore, a configuration is provided such that, at a time when the service center 3 issues the operation command to the vehicle properly, it assumes that the remote operation is accepted, and thus, accepts cancel operation within the cancel operation acceptance time (for example, 24 hours) from that time (S12).

Whether or not the operation command is properly issued to the vehicle 5 can be determined from whether or not the service center 3 receives the arrival notification from the vehicle 5. For example, when the service center 3 carries out communication with the use of a short message service which is used in the mobile communication network, the service center 3 can obtain the operation command arrival notification within a short time period from the vehicle 5.

After the service center 3 receives the arrival notification, the cancel operation is allowed thereby. Accordingly, even before the user receives the operation completion notification, the cancel operation is allowed when the user accesses the service center 3 after the service center receives the arrival notification.

Figure 12:
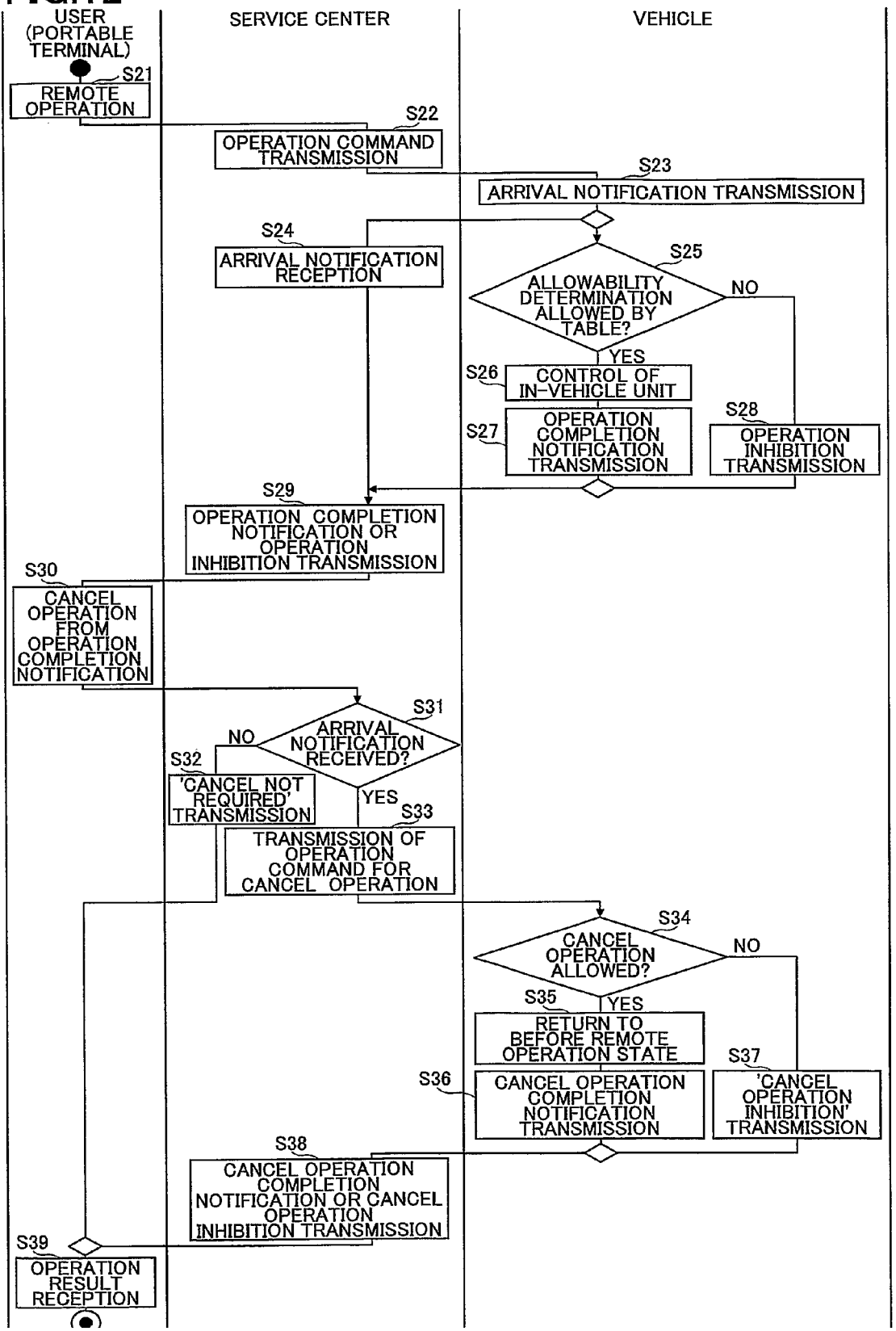
FIG. 12 shows one example of activity showing a flow of processing for returning to an original state when the user's remote operation is cancelled.

Based on an activity diagram of FIG. 12, a processing flow in which remote operation made by the user is canceled, and the original state is returned to with the use of the above-described configuration is described. When the user carries out remote operation with the use of the portable unit 2, the operation command is transmitted to the service center 3 (S21). The service center 3 receives the operation command, records the operation command reception history in a time series manner, and also, transmits the operation command to the vehicle 5 (S22). The vehicle 5 transmits the arrival notification when properly receiving the operation command (S23), thus the service center 3 receives the arrival notification (S24), and after that, the service center 3 can allow the cancel operation.

Next, the remote operation allowability determination part 12 determines whether or not the received operation command is in principle allowed, from the allowability determination table, and, if it is allowed, and, the remote operation allowability determination part 12 extracts the vehicle's states from the vehicle state storage part 14 and determines whether or not the control of the in-vehicle unit 17 based on the operation command is allowed (S25).

When the Control of the in-vehicle unit 17 is allowed (Yes in Step S25), the control signal generating part 15 generates the control signal, the control part 16 controls the in-vehicle unit 17 (S26), and the remote operation response generating part 13 generates the operation completion notification (S27). When the control of the in-vehicle unit 17 is not allowed (No in Step S25), a notification of operation inhibition is transmitted to the service center 3 (S28).

Since the service center then transmits the operation completion notification or the operation inhibition notification to the portable unit 2 (S29), the user can determine whether or not the remote operation has been completed.

In a case where a person is locked in the vehicle, and the user wishes the cancel operation, the user can carry out the cancel operation by selecting the URL provided by the operation completion notification (S30). When the cancel operation is carried out, the service center 3 determines whether or not the arrival notification for the cancellation target remote operation from the vehicle 5 has been received (S31). When the arrival notification has not been received, the service center 3 transmits a notification that the cancel operation is not necessary, to the portable unit 2 (S32).

When the arrival notification has been received (Yes in S31), the service center 3 transmits the operation command for the cancel operation to the vehicle 5 (S33), and thus, the vehicle 5 determines whether to not the control of the in-vehicle unit 17 based on the operation command is to be allowed (S34). The remote operation allowability determination part 12 reads the cancel operation determination table and also extracts the vehicle's state from the vehicle state storage part 14 to determine whether or not the control of the in-vehicle unit 17 based on the cancel operation is to be allowed (S34).

When the control of the in-vehicle unit 17 based on the cancel operation is to be allowed (Yes in S34), the control signal generating part 15 generates such a control signal as to return to the vehicle's state extracted from the vehicle state storage part 14, based on the remote operation number of the cancellation target (S35). When the control of the in-vehicle unit 17 based on the cancel operation is thus completed, the remote operation response generating part 13 generates the cancel operation completion notification, and thus, the vehicle 5 transmits the cancel operation completion notification to the service center 3 (S36).

When the control of the in-vehicle unit 17 based on the cancel operation is not allowed (No in Step S34), the remote operation response generating part 13 generates a notification of cancel operation inhibition, and thus, the vehicle transmits the cancel operation inhibition notification to the service center 3 (S37). It is note that, since the cancel operation should be carried out as long as possible, it is preferable that the determination in Step S34 is automatically repeated, or the URL guiding the user again to the cancel operation is transmitted to the portable unit 2.

Since the service center 3 transmits the cancel operation completion notification or the cancel operation inhibition notification to the portable unit 2 (S38), the user can determine from the received operation result whether or not the cancel operation has been completed (S39).

Thus, according to the first embodiment, as described above, operation to return to the original state is in principle inhibited. However, by carrying out cancel operation after carrying out control of the vehicle, it is possible to return the vehicle into the original state. Thereby, the operation can be canceled when the user has carried out remote operation unintentionally or a situation occurs in which the user wishes to cancel the remote operation after carrying out it and wishes to return to the original state. Since the cancel operation is allowed only when the predetermined conditions are met, degradation in security can be avoided.

A second embodiment of the present invention is described next.

In the first embodiment, whether or not cancel operation of remote operation is to be allowed is determined by the vehicle 5 based on the cancel operation allowability table. However, the cancel operation allowability determination table has conditions, i.e., a) common precondition; b) local operation of the in-vehicle unit does not occur; d) any one of IG, ACC is not turned on; and so forth. As a result, a situation in which the cancel operation may not be allowed may occur without being recognized by the user who made the cancel operation, when another user operates the vehicle locally. When thus the cancel operation is made not allowable without being recognized by the user even within the predetermined time period (for example, 24 hours) from the remote operation, the user should receive the cancel operation inhibition notification and may confuse since the user cannot understand the reason therefor.

In a remote operation system in the second embodiment, even when the cancel operation is made not allowable due to local operation of the vehicle for example, the service center notifies the user of this matter. In the second embodiment, thus the service center 3 is one which determines whether or not the cancel operation is to be allowed.

The service center 3 accepts cancel operation when any one of the following conditions (referred to as cancel allowable condition, hereinafter) is met:

i) In the operation completion notification notified of from the vehicle as the operation result, cancel is allowed from a vehicle status (cancel allowability state flag);

ii) The operation completion notification notified of from the vehicle is such that analysis thereof is not possible; and iii) The operation completion notification notified of from the vehicle has not reached the service center 3 and time out occurs.

However, even when the cancel allowable condition is met, the service center 3 dose not accept the cancel operation when the following condition (referred to as cancel operation stop condition, hereinafter) is met:

1) A predetermined time period (in the present embodiment, 24 hours) has elapsed after accepting the cancel operation; and 2) In the operation completion notification notified of from the vehicle as the operation result, cancel is not allowed from the cancel allowability state flag.

Figure 13:
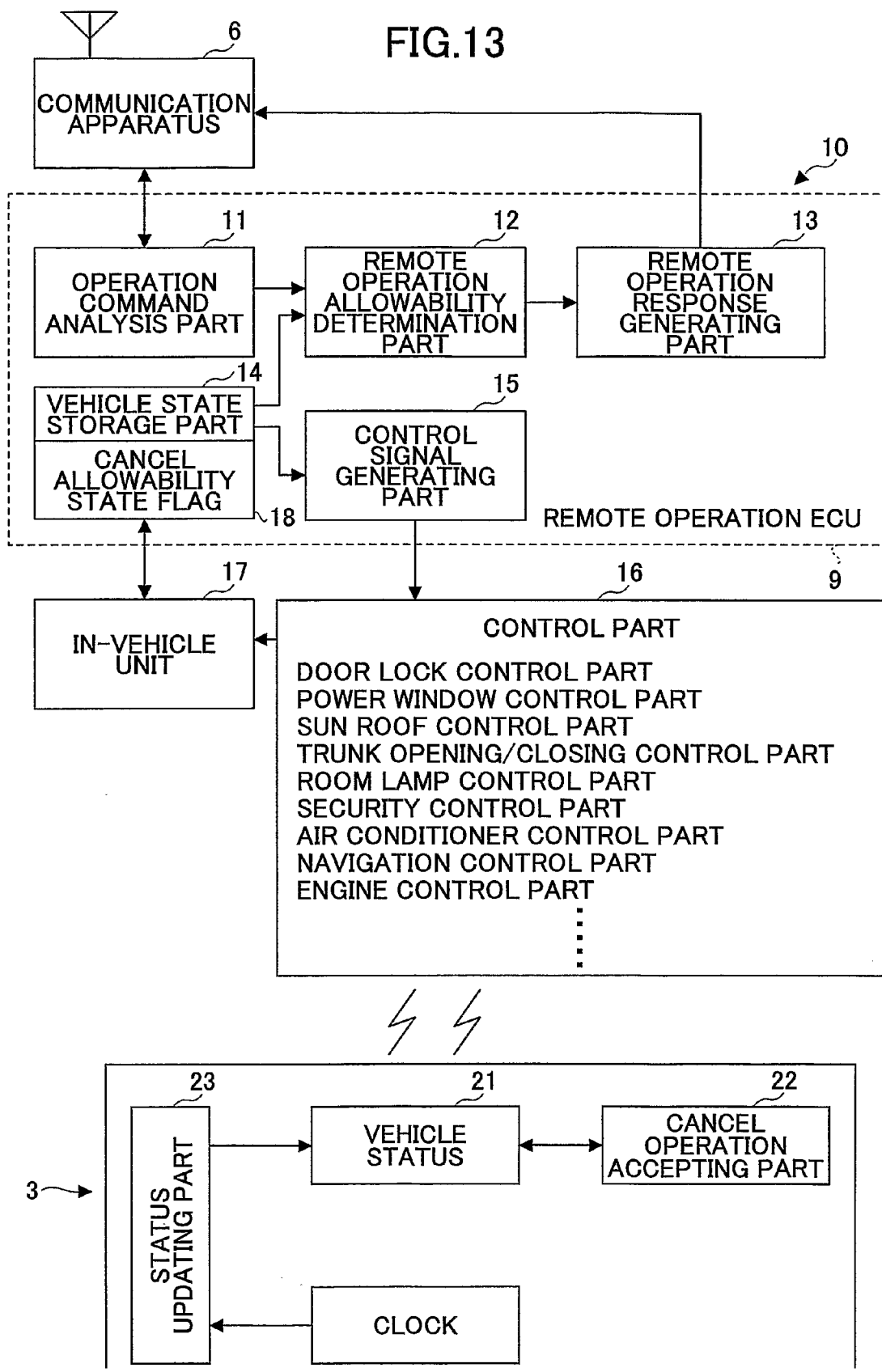
FIG. 13 shows a block diagram of the remote operation apparatus in a second embodiment.

FIG. 13 shows a block diagram of the remote operation apparatus 10. In FIG. 13, the same reference numerals are given to the components the same as those in FIG. 3, and duplicate description is omitted. In FIG. 13, different from FIG. 3, the vehicle state storage part 14 has the cancel allowability state flag 18.

The cancel allowability state flag 18 is a flag which indicates whether or not the current vehicle allows cancel operation. When the cancel allowability state flag is '1' (simply referred to as 'allowable' hereinafter), it indicates allowable, while, when the cancel allowability state flag is '0' (simply referred to as 'not allowable' hereinafter), it indicates not allowable. The cancel allowability state flag 18 becomes 'allowable' after remote operation is carried out, and becomes 'not allowable' when one of the conditions of items a) through d) of the cancel operation determination table is met. The cancel allowability state flag is set for each in-vehicle unit 17.

When an operation command for cancel operation is received from the user's portable unit 2 via the service center 3, the remote operation allowability determination part 12 determines, not with reference to the cancel operation allowability table but with reference to the cancel allowability state flag 18, whether or not the cancel operation is to be allowed, in the second embodiment.

The service center 3 has a vehicle status 21, a cancel operation accepting part 22 and a status updating part 23. The cancel allowability state flag 18 is transmitted to the service center 3 together with the operation completion notification. The status updating part 23 updates the vehicle status 21 into 'allowable' when the cancel allowability state flag 18 has the state 'allowable', while updating the vehicle status 21 into 'not allowable' when the cancel allowability state flag 18 has the state 'not allowable'. The vehicle status is held for each vehicle, and is held for each in-vehicle unit such as the window control part, door control part or such. The cancel operation accepting part 22 determines with reference to the vehicle status 21 whether or not the cancel is accepted, when the user requests the cancel operation.

Further, the service center 3 has a clock (timer) 24 for measuring a time elapse from the occurrence of remote operation, and holds the time (for example, a time at which the operation completion notification is received from the vehicle, a time at which the vehicle status 21 is updated, or such) at which the remote operation is carried out for each in-vehicle unit of each vehicle.

The status updating part 23 reads the cancel allowable condition and the cancel operation stop condition, and updates the vehicle status 21 into 'allowable' or 'not allowable'. For example, when a predetermined time period (for example, 24 hours) has elapsed from the remote operation, the vehicle status is updated into 'not allowable'.

In the cancel operation allowability determination table of the vehicle 5, the condition b) of 'within the predetermined time period from remote operation' is also included in the conditions to allow cancel operation. Accordingly, even when the predetermined time period has not elapsed in the service center 3, the predetermined time may have elapsed in the vehicle 5. Therefore, in the second embodiment, the predetermined time period Tc in the vehicle 5 is set longer than the predetermined time period Ts in the service center 3 (Tc>Ts). Accordingly, for example, Ts=24 hours, Tc=25 hours. Thereby, a situation that, when the predetermined time period has not elapsed in the service center 3, cancel operation is inhibited in the vehicle 5, is avoided. Further, even when Tc>Ts, cancel operation after Tc can be inhibited. Accordingly, security in the vehicle can be ensured.

[In Case where the Vehicle is Locally Operated]

Figure 14:
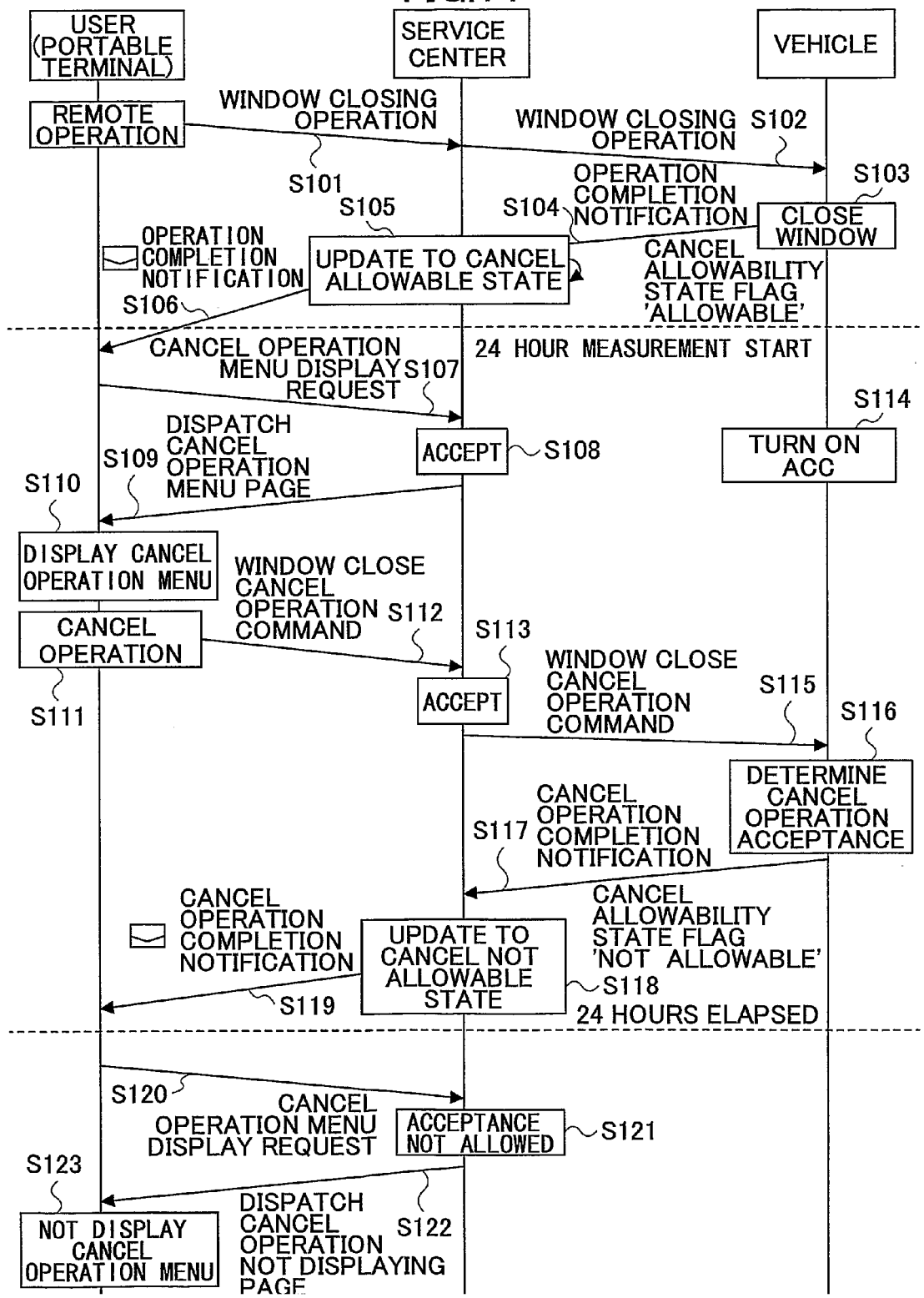
FIG. 14 shows a flow chart of control procedure in which cancel operation is not allowed when the vehicle is locally operated after remote operation.

FIG. 14 shows a flow chart of a control procedure in which cancel operation is not allowed when the vehicle is operated locally after remote operation.

First, the user operates the portable unit 2, and transmits an operation command for remote operation of closing the window to the service center 3 (S101). The service center 3 transmits the operation command to the vehicle 5 (S102). The control part 16 of the vehicle 5 closes the window based on the control signal for closing the window (S103). Further, the vehicle state storage part 14 sets the cancel allowability state flag 18 of the window into 'allowable'.

Then, the remote operation response generating part 13 transmits the operation completion notification to the service center 3 since the window is thus controlled and is closed (S104). Together with the operation completion notification, the cancel allowability state flag 18 is transmitted to the service center 3. The status updating part 23 in the service center 3 updates the vehicle status 21 into 'allowable' condition (S105). Further, the cancel operation acceptance time measurement is started from a time at which the service center 3 receives the operation completion notification from the vehicle 5 and the updating is thus made so that cancel of the remote operation becomes allowable.

The service center 3 transmits the operation completion notification to the portable unit 2 (S106). The operation result is transmitted, for example via an electronic mail, and, when the electronic mail is opened, the operation completion notification of the remote operation as shown in FIG. 8 (a) is displayed on the portable unit 2.

When the user wishes cancellation of the window closing operation, the user selects the URL of the operation comple-tion notification, and requests display of a cancel operation menu from the service center 3 (S107). At this time, the vehicle status 21 held by the service center 3 has thus become 'allowable', and thus, the service center 3 accepts the cancel operation (S108), and transmits the cancel operation menu page to the portable unit (S109).

Figure 15:
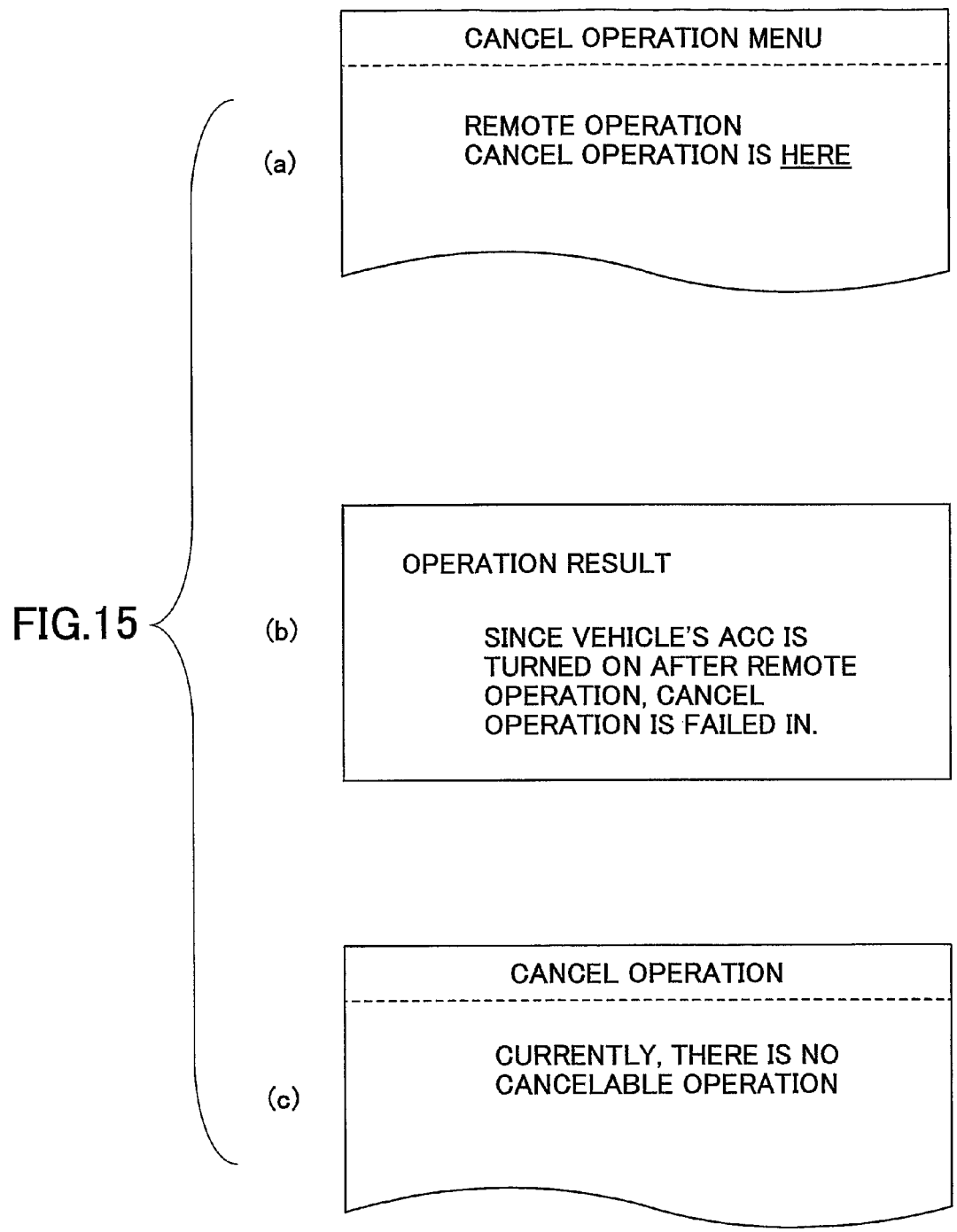
FIG. 15 shows a cancel operation menu and so forth displayed on a portable unit.

As a result, the cancel operation menu page is displayed on the user's portable unit 2 (S110). FIG. 15 (a) shows one example of the cancel operation menu page displayed on the portable unit 2. When the user selects 'HERE' displayed in a link manner (S111), an operation command for cancel the operation for the window closure is transmitted to the service center 3 (S112). A list of cancel operations which can be carried out may be displayed.

At the time at which the service center 3 receives the operation command of the cancel operation, the vehicle status 21 held by the service center 3 is 'allowable'. Accordingly, the service center 3 accepts the cancel operation.

There, until the service center 3 thus receives the operation command of the cancel operation since the window of the vehicle 5 was closed in Step S103, ACC in the vehicle is turned on locally for example (S114). In such a case, thereby, the cancel allowability state flag 18 held by the vehicle 5 is turned into 'not allowable'. That is, when the vehicle 5 is locally operated or so, it is determined that the operation right of the vehicle 5 is transferred to the person who locally operates the vehicle 5, from the person who has the portable unit 22.

The service center 3 transmits the operation command of the cancel operation to the vehicle 5 (S115). The remote operation allowability determination part 12 of the vehicle 5 reads the cancel allowability state flag 18, and determines whether or not the cancel operation is to be accepted (S116). Since the cancel allowability state flag 18 has been turned 'not allowable' in Step S114, the vehicle 5 does not accept the cancel operation. As a result, the remote operation response generating part 13 generates the operation completion notification indicating that the cancel operation has not been executed, to the service center 3 together with the cancel allowability state flag of 'not allowable' (S117).

The status updating part 23 of the service centre 3 reads the state 'not allowable' of the cancel allowability flag 18, and updates the vehicle status into 'not allowable' state (S118). Further, the remote operation response generating part 13 of the service, center 3 transmits to the portable unit 2 the cancel operation completion notification indicating that the cancel operation has not been carried out (S119).

As a result, when the user opens the electronic mail, the cancel operation completion notification such as that shown in FIG. 15 (b) is displayed on the portable unit 2. In FIG. 15 (b), a message 'since ACC is turned on after remote operation, cancel operation is failed in' is displayed.

When the user requests display of the cancel operation menu from the service center 3 again for the purpose of confirmation, the service center 3 reads the state 'not allowable' of the vehicle status 21 and thus, does not accept the cancel operation (S121). Then, the service center 3 transmits a cancel operation menu not displaying page, not displaying cancel operation, to the portable unit 2 (S122).

As a result, on the portable unit 2, the cancel operation menu not displaying page such as that shown in FIG. 15 (c) is displayed. As shown in FIG. 15 (c), when the service center 3 does not accept the cancel operation, a message 'currently, there is no cancelable operation' is displayed.

Thus, when the vehicle is locally operated without being recognized by the user after the remote operation, the service center 3 is notified that cancel operation is not allowable. As a result, the cancel operation completion notification indicating that the cancel operation is failed in is notified of to the user, and after that, the cancel operation menu is not displayed. Accordingly, a situation that the cancel operation menu comes to be not displayed without any advance notice, can be avoided, and the remote operation system, easily understandable by the user, by which the user can be free from confusion can be achieved.

[In Case where a Predetermined Time Period (24 Hours in the Second Embodiment) has Elapsed Since the Service Centre 3 Accepted the Remote Operation]

Figure 16:
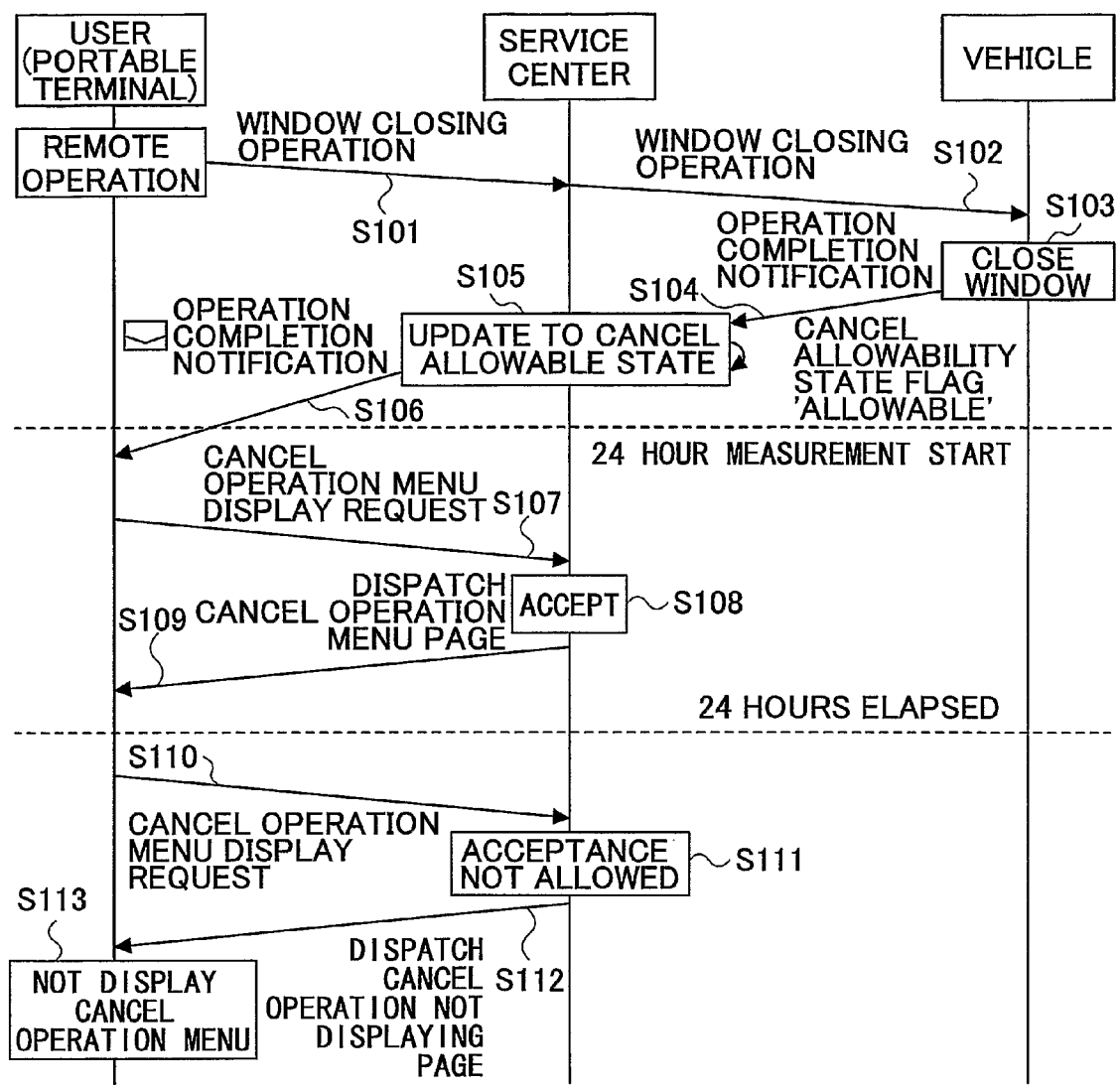
FIG. 16 shows a flow chart of processing for when cancel of remote cancel is not accepted since a predetermined time period has elapsed from when the service center accepted the remote operation.

Next, a case where cancellation of remote operation is not accepted since the predetermined time period (24 hours in the second embodiment) has elapsed since the service centre 3 received the remote operation, is described based on a flow chart of FIG. 16.

First, the user operates the portable unit 2, and transmits an operation command for remote operation of closing the window to the service center 3 (S101). The service center 3 transmits the operation command to the vehicle 5 (S102). The control part 16 of the vehicle 5 closes the window based on the control signal for closing the window (S103). Further, the vehicle state storage part 14 sets the cancel allowability state flag 18 of the window into 'allowable'.

Then, the remote operation response generating part 13 transmits the operation completion notification to the service center 3 since the window is thus controlled and closed (S104). Together with the operation completion notification, the cancel allowability state flag 18 is transmitted to the service center 3. The status updating part 23 in the service center 3 reads the state 'allowable' of the cancel allowability state flag 18 and updates the vehicle status 21 into allowable condition (S105). Further, the cancel operation acceptance time measurement is started from a time at which the service center 3 receives the operation completion notification from the vehicle 5 and the updating is thus made so that cancel of remote operation becomes allowable.

The service center 3 transmits the operation completion notification to the portable unit 2 (S106). The operation result is transmitted, for example via an electronic mail, and, when the electronic mail is opened, the operation completion notification of the remote operation as shown in FIG. 8 (a) is displayed on the portable unit 2.

When the user wishes cancellation of the window closing operation, the user selects the URL of the operation completion notification, and requests display of a cancel operation menu from the service center 3 (S107). At this time, 24 hours have not elapsed since the serviced center 3 received the operation completion notification, and thus, the vehicle status 21 held by the service center 3 is kept 'allowable'. Thus, the service center 3 accepts the cancel operation (S108), and transmits the cancel operation menu page to the portable unit 2 (S109). As a result, the cancel operation menu page is displayed on the user's portable unit 2.

Figure 17:
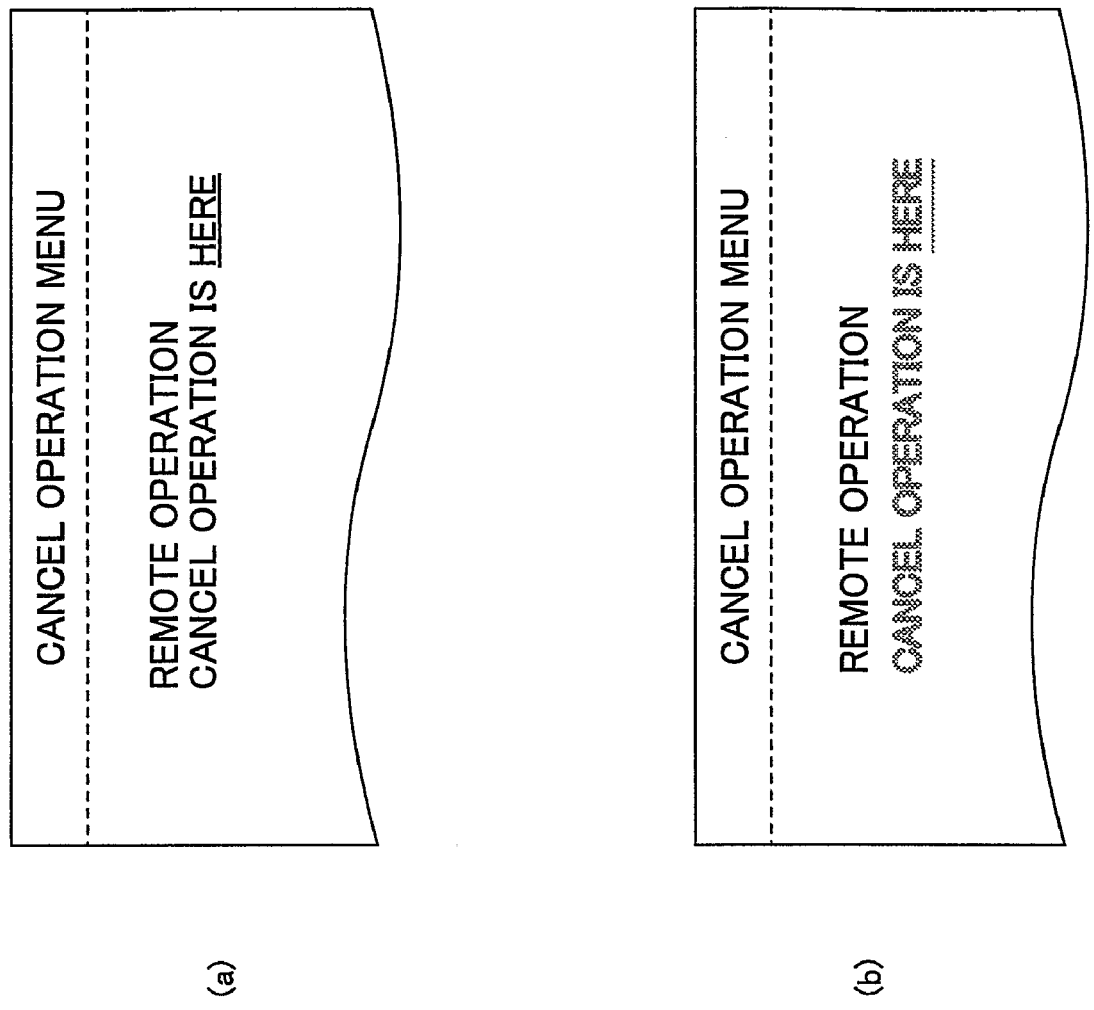
FIG. 17 shows one example of a cancel operation menu displayed on the portable unit.

FIG. 17 (a) shows one example of the cancel operation menu displayed on the portable unit 2 of the user. When the user selects HERE displayed in a link manner, the operation command for the cancel operation of the window closing is transmitted to the service center 3. However, it is assumed here that the user does not actually make the cancel operation.

When, 24 hours has elapsed since the service center 3 received the operation completion notification from the vehicle 5, the status updating part 23 detects that 24 hours has elapsed and updates the vehicle status 21 into 'not allowable'.

When the user selects the URL from the operation completion notification after the elapse of 24 hours and requests display of the cancel operation menu from the service center 3 (S110), the service center 3 does not accept the cancel operation menu display request since the vehicle status 21 has been thus turned 'not allowable' (S111). Then, the cancel, operation menu not displaying page is dispatched to the portable unit 2 (S112). On the portable unit 2, the cancel operation menu not displaying page is displayed (S113).

FIG. 17 (b) shows one example of the cancel operation menu not display page displayed on the portable unit 2 of the user. In FIG. 17 (b), the same as FIG. 17 (a), a message 'cancel operation is HERE' is displayed. However, a configuration is made such that 'HERE' having a link cannot be selected therefrom, and the user cannot transmit the operation command for the cancel operation. It is noted that the cancel operation menu not displaying page of is merely an example. Another page as that shown in FIG. 15 (c) may be applied.

Thus, when request for displaying the cancel operation menu is given by the user after the elapse of the predetermined time period after the remote operation, the service center 3 determines that the cancel operation is not allowed. Accordingly, a situation in which the cancel operation menu comes to be not displayed in timing which the user cannot expect, can be avoided, and the remote operation system, easily understandable by the user, by which the user can be free from confusion, can be achieved.

[Determination of Cancel Operation Acceptance by the Service Center 3]

Next, a case where the service center 3 determines whether or not cancel operation is to be accepted, based on the above-mentioned cancel allowable conditions i) through iii) and the cancel operation stop conditions 1) and 2), is described with reference to a flow chart of FIG. 18. It is noted that the same reference numerals are given to the steps the same as those of FIG. 16, and duplicated description is omitted.

Figure 18:
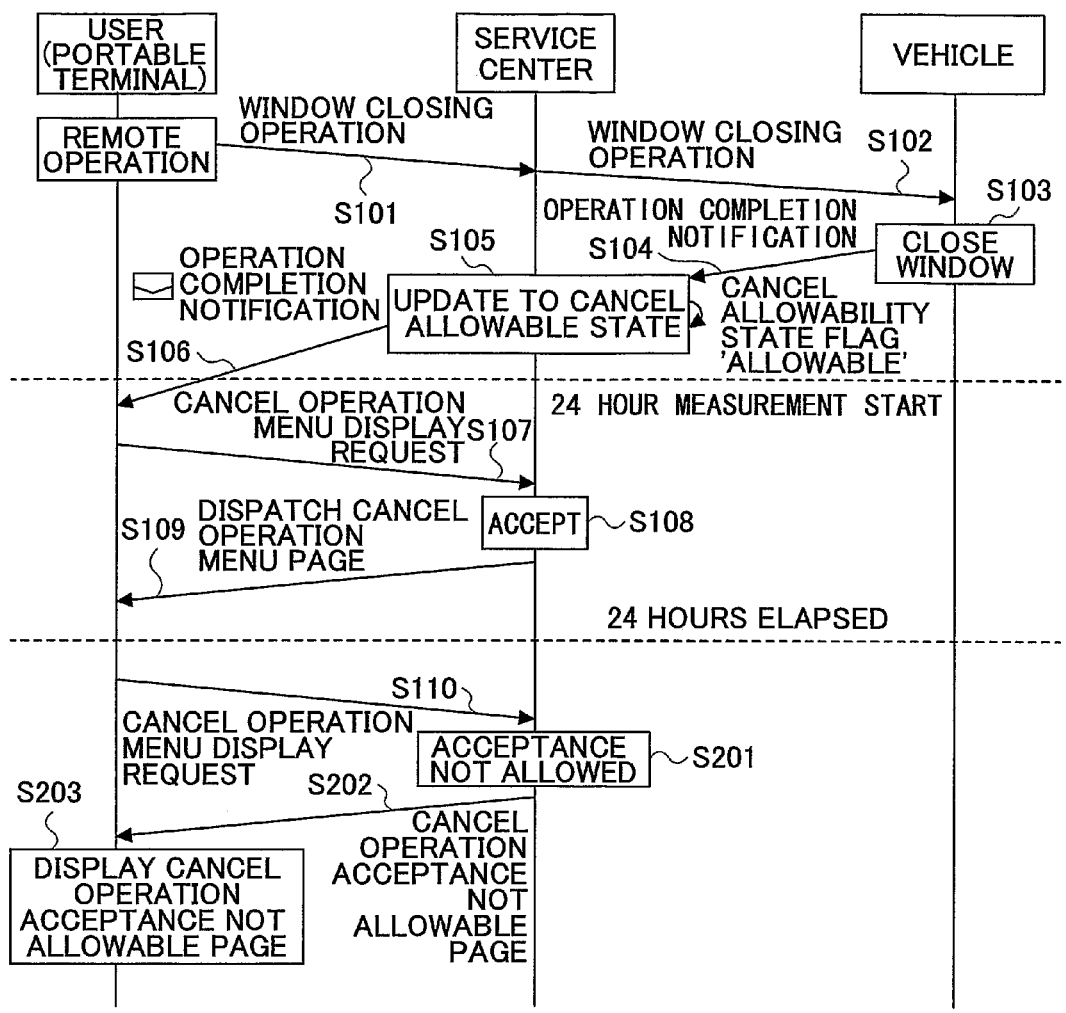
FIG. 18 shows a flow chart of processing in which it is determined based on cancel allowable condition and cancel operation stop condition whether or not the cancel operation is to be accepted.

In the flow chart of FIG. 18, the processing up to the step (S110) that the user selects the URL of the operation completion notification after the elapse of 24 hours and requests display of the cancel operation menu from the service center 3, is the same as that of the processing of FIG. 16.

In the processing of FIG. 18, the cancel operation accepting part 22 of the service center 3 reads the vehicle status 21, and does not accept the display request for the cancel operation menu (S201). Then, the service center 3 dispatches a cancel operation acceptance not allowable page to the portable unit 2 (S202). On the portable unit 2, the cancel operation acceptance not allowable page is displayed (S203).

In FIG. 19, one example of the cancel operation acceptance not allowable page displayed on the portable unit 2 is shown. In FIG. 19, the current time, the vehicle's stopped (parked) location, and a message 'currently, there is no cancelable operation' are displayed.

By this processing, since the service center 3 determines whether or not cancel operation is to be accepted, the sequence of request for the cancel operation to the vehicle 5 and reception of the operation completion notification from the vehicle can be omitted. Further, by omitting this sequence, response to the user can be made rapidly.

Further, a situation in which operation request is transmitted to the vehicle in an unexpected timing can be avoided. As a result, erroneous operation in the vehicle can be avoided.

[A Case where 24 Hours within which Cancel Operation is Accepted is Determined Based on User's Operation Time]

In the processing in FIGS. 14, 16 and 18 in the present embodiment, the user's cancel operation is not accepted when 24 hours have elapsed in the service center 3. However, even when 24 hours have elapsed since operation completion notification was received, the user's intention should preferably considered when the user indicates the intention for cancel operation to the service center 3.

Figure 20:
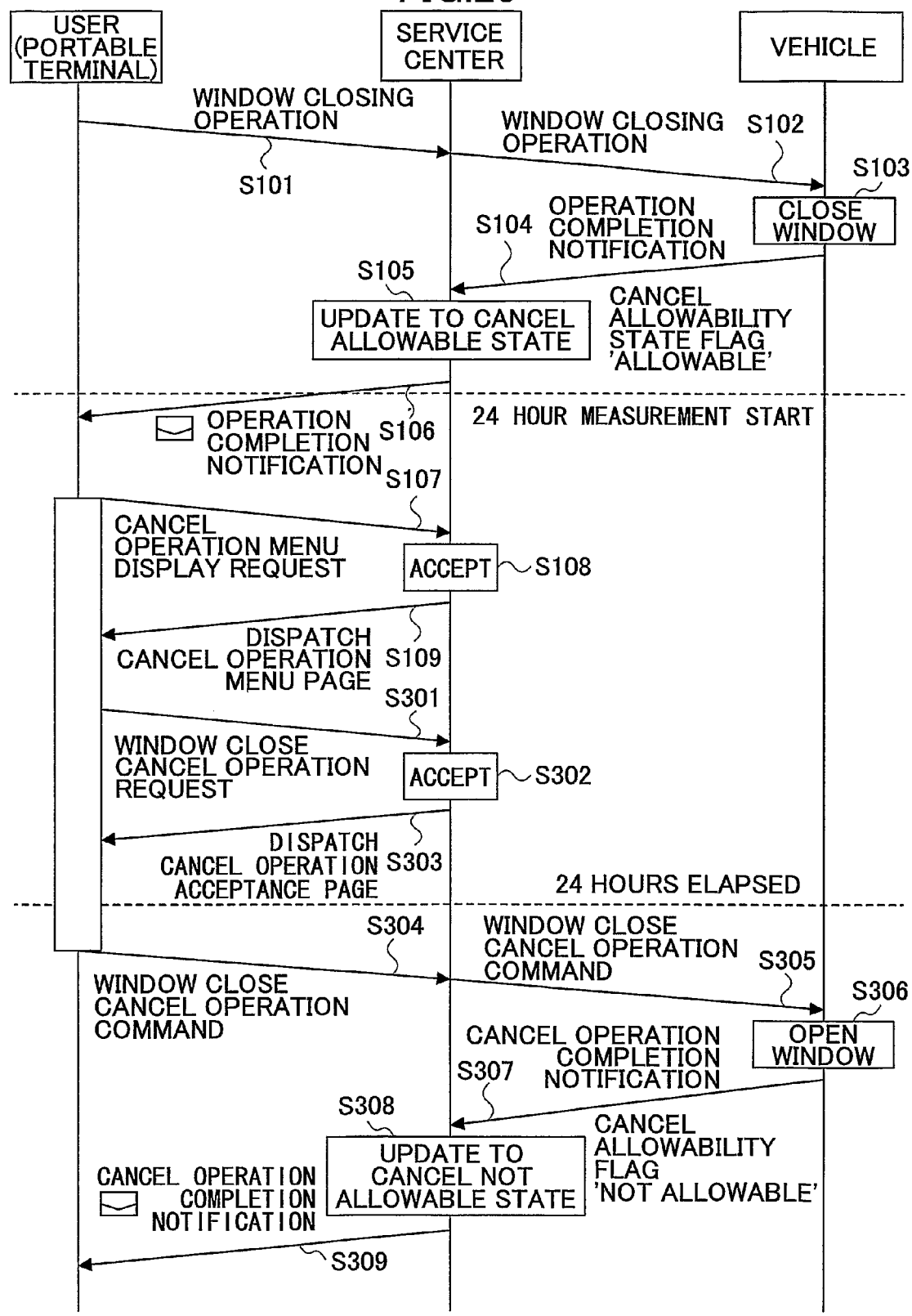
FIG. 20 shows a flow chart of processing in which cancel operation is accepted based on a time at which the user actually makes operation when the service center cannot receive the operation competition notification.

FIG. 20 shows a flow chart of processing for accepting cancel operation based on the time at which the user actually made operation, even when 24 hours have elapsed in the service center 3. In FIG. 20, the same reference numerals are given to the steps the same as those in FIG. 16.

First, the user operates the portable unit 2, and transmits an operation command for remote operation of closing the window to the service center 3 (S101). The service center 3 transmits the operation command to the vehicle 5 (S102). The control part 16 of the vehicle 5 closes the window based on the control signal for closing the window (S103). Further, the vehicle state storage part 14 sets the cancel allowability state flag 18 of the window into 'allowable'.

Then, the remote operation response generating part 13 transmits the operation completion notification to the service center 3 since the window is thus controlled and closed (S104). Together with the operation completion notification, the cancel allowability state flag 18 is transmitted to the service center 3. The status updating part 23 in the service center 3 reads the state 'allowable' of the cancel allowability state flag 18 and updates the vehicle status 21 into allowable condition (S105). Further, the cancel operation acceptance time measurement is started from a time at which the service center 3 receives the operation completion notification from the vehicle 5 and the updating is thus made so that cancel of remote operation becomes allowable.

The service center 3 transmits the operation completion notification to the portable unit 2 (S106). The operation result is transmitted, for example via an electronic mail, and, when the electronic mail is opened, the operation completion notification of the remote operation as shown in FIG. 8 (*a*) is displayed on the portable unit 2.

When the user wishes cancellation of the window closing operation, the user selects the URL of the operation completion notification, and requests display of a cancel operation menu from the service center 3 (S107). At this time, 24 hours have not elapsed since the serviced center 3 received the operation completion notification, and thus the vehicle status 21 held by the service center 3 is kept 'allowable'. Thus, the service center 3 accepts the cancel operation (S108), and transmits the cancel operation menu page to the portable unit 2 (S109). As a result, the cancel operation menu page as shown in FIG. 17 (*a*) is displayed on the user's portable unit 2.

Then, when the user selects 'HERE' displayed in a link manner, window closure cancel operation request is transmitted to the service center (S301). Since 24 hours have not elapsed since the service center 3 received the operation completion notification, the service center 3 accepts the cancel operation (S302). Then, the service center 3 dispatches the cancel operation acceptance page (S303).

Figure 21:
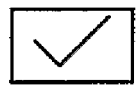
FIG. 21 shows one example of the cancel operation acceptance page.

FIG. 21 shows one example of the cancel operation acceptance page. In the cancel operation acceptance page, the current time, the vehicle's stopped location, and cancelable operation are displayed. For the cancelable operation, a check box and date/time at which the remote operation was carried out are displayed. The user checks the check box and selects the 'OK' button when determining that the remote operation should be cancelled after confirming the date/time and the remote operation contents.

There, it is assumed that 24 hours have elapsed until the user actually selects the 'OK' button since the service center 3 accepted the cancel operation. As a result, the cancel operation's operation command transmitted to the service center 3 when the user selects the 'OK' button reaches the service center 3 after the elapse of 24 hours from the operation completion notification.

When 24 hours have thus elapsed, the vehicle status 21 is turned 'not allowable'. However, since the service center 3 has already accepted the cancel operation in Step S302, the service center 3 transmits the cancel operation to the vehicle without judging whether or not the cancel operation should be accepted when receiving the operation command (S305).

Also in the vehicle, 24 hours have already elapsed. However, in the present embodiment, the vehicle's predetermined time Tc is set longer than the predetermined time Ts of the service center 3, and thus, the cancel allowability state flag 18 in the vehicle is still kept 'allowable'.

The remote operation allowability determination part 12 in the vehicle 5 reads the cancel allowability state flag 18 having the state 'allowable' and allows the cancel operation. Accordingly, the control part 16 executes the cancel operation, i.e., carries out operation of opening the window (S306). The vehicle state storage part 14 sets the cancel allowability state flag 18 'not allowable', and the remote operation response generating part 13 transmits the operation completion notification to the service center 3 (S307).

The service center 3 receives the operation completion notification, and updates into the cancel 'not allowable' state (S308). Then, the service center 3 transmits the operation completion notification to the portable unit 2 by means of an electronic mail or such (S309). When the user opens the electronic mail, a message 'window has been opened' is displayed.

In the processing of FIG. 20, even when 24 hours have elapsed until the user actually transmits the cancel operation request since the cancel menu display page was dispatched to the portable unit 2, the service center 3 can be prevented from determining that the cancel operation cannot be accepted. Thereby, the user can be free from a confusing situation such that, after the cancel menu display page is dispatched to the user from the service center 3, the cancel operation cannot be actually accepted. Further, the user's intention can be considered when the user wishes the cancel operation, and thus, for example, locking a person or such in the vehicle, can be avoided.

The time of determining whether or not 24 hours have elapsed may be a time at which the cancel operation request in Step S301 is given, or a time at which the cancel operation request in Step S304 is given.

[In a Case where the Service Center 3 Cannot Properly Receive the Operation Completion Notification of Remote Operation from the Vehicle 5]

When the service center 3 cannot properly receive the operation completion notification of the remote operation from the vehicle 5, the service center 3 cannot receive the cancel allowability state flag 18 even though the vehicle is actually remotely operated. In this case, the service center 3 cannot accept the cancel operation. Therefore, a configuration is provided such that, when the service center 3 cannot receive the operation completion notification, the cancel operation is in principle accepted within 24 hours since the operation command of the remote operation was transmitted. Thus, the cancel operation can be easily accepted.

Figure 22:
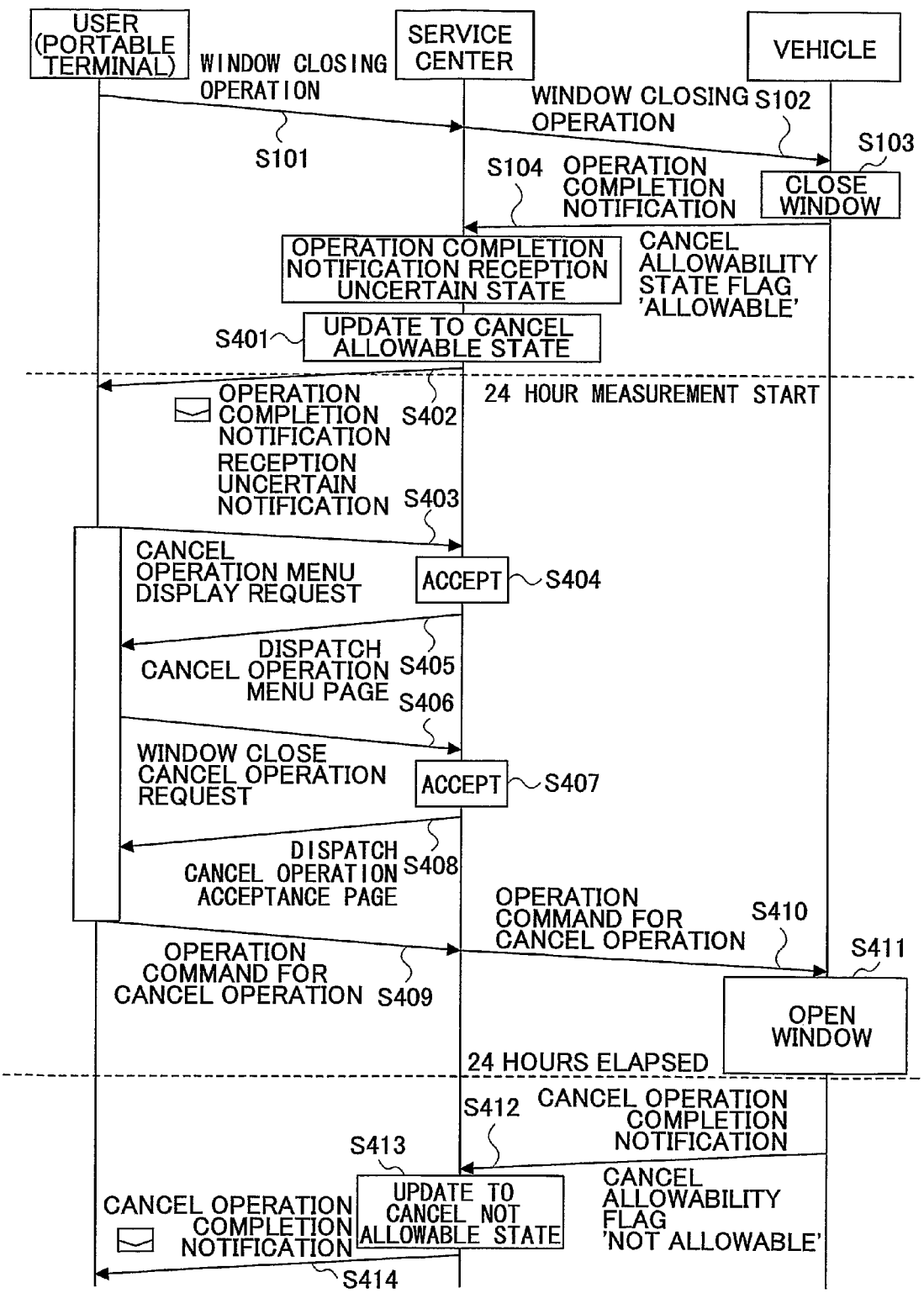
FIG. 22 shows a flow chart of processing procedure of cancel operation accepted when the service center cannot receive the operation completion notification.

FIG. 22 shows a flow chart of processing procedure of cancel operation which is accepted when the service center 3 cannot receive the operation completion notification.

First, the user operates the portable unit 2, and transmits an operation command for remote operation of closing the window to the service center 3 (S101). The service center 3 transmits the operation command to the vehicle 5 (S102). The control part 16 of the vehicle 5 closes the window based on the control signal for closing the window (S103). Further, the vehicle state storage part 14 sets the cancel allowability state flag 18 of the window 'allowable'.

Then, the remote operation response generating part 13 transmits the operation completion notification to the service center 3 since the window is thus controlled and closed (S104).

Together with the operation completion notification, the cancel allowability state flag 18 is transmitted. However, a case may occur (simply referred to as 'operation completion notification reception uncertain state', hereinafter) where the operation completion notification or the cancel allowability state flag 18, received by the service center 3, is difficult to analyze, or time out occurs due to bad communication condition. In the operation completion notification reception uncertain state, the service center 3 updates the vehicle status 21 for the window of the vehicle 5 into the 'allowable' state (S401).

The service center 3 transmits information of the operation completion notification reception uncertain state to the portable unit 2 by means of an electronic mail (S402). FIG. 23 shows one example of the electronic mail of the operation completion notification reception uncertain state. As shows in FIG. 23, for the user, a message 'Notification for vehicle remote operation result is unusual. Please check vehicle condition' is shown. Accordingly, then, the user can confirm the vehicle state by means of other remote operation for example.

When the user notices that a person or such may be locked in the vehicle and wishes to cancel the window closure operation, the user accesses a predetermined URL, and requests display of the cancel operation menu from the service center (S403).

The vehicle status 21 held by the service center 3 has been updated into 'allowable' (S401). Accordingly, the service center 3 accepts the cancel operation (S404), and transmits the cancel operation page to the portable unit 2 (S405). On the portable unit 2 of the user, the cancel operation menu such as that shown in FIG. 17 (*a*) is displayed.

When the user selects 'HERE' displayed in a link manner, the cancel operation request for the window closing is transmitted to the service center (S406). The service center accepts the cancel operation (S407). Then, the service center 3 dispatches the cancel operation acceptance page (S408). It is noted that a time at which the service center 3 receives the operation command of the cancel operation is within 24 hours since the vehicle status 21 was updated into 'allowable' state, in this case.

Since the cancel operation acceptance page such as that shown in FIG. 21 is displayed on the portable unit 2, the user checks the check box and selects the OK button when canceling the remote operation. Thereby, the operation command of the cancel operation is transmitted to the service center 3 (S409).

The service center 3 transmits the operation command of the cancel operation to the vehicle 5 (S410). The remote operation allowability determination part 12 in the vehicle 5 reads the cancel allowability state flag 18 having the state 'allowable', allows the cancel operation, and thus, the control part 16 executes the cancel operation, i.e., operation of opening the window (S411). The vehicle state storage part 14 sets the cancel allowability state flag 18 'not allowable', and the remote operation response generating part 13 transmits the operation completion notification to the service center (S412).

The status updating part 23 in the service center 3 receives the operation completion notification and updates the vehicle status 21 into 'not allowable' state (S413). Then, the service center 3 transmits the operation completion notification to the portable unit 2 by means of an electronic mail or such (S414). When the user opens the electronic mail, a message 'window has been opened' is displayed.

In the processing of FIG. 22, even when it is not certain as to whether or not remote operation has been completed, cancel operation of the remote operation is accepted, and thus, locking in the vehicle can be avoided as long as possible.

Thus, according to the present embodiment, remote operation can be canceled and an original state can be returned to, and also, the service center 3 can determine whether or not the cancel operation is to be accepted. Since the service center 3 thus determines, communication with the vehicle is not needed, and thus, response can be smoothly achieved. When the cancel operation menu is not displayed, the user is notified of the reason. Accordingly, a service which is easily understandable by the user can be provided. Further, cancel operation is accepted as much as possible even after a predetermined time period has elapsed or even when it is not certain as to whether of not the remote operation has been completed. Accordingly, the user's intention is considered and the cancel operation can be executed as much as possible.

Further, the present invention is not limited to the above-described embodiments, and variations and modifications may be made without departing from the basic concept of the present invention claimed below.

The present application is based on Japanese priority applications Nos. 2005-199194 and 2006-015100, filed on Jul. 7, 2005 and Jan. 24, 2006, respectively, the entire contents of which are hereby incorporated herein by reference.

The invention claimed is:

1. A remote operation system comprising:
   a vehicle;
   a portable unit that is carried by a driver;
   a service center; and
   an in-vehicle unit that is controlled by an operation command transmitted from the portable unit via the service center, wherein:
   when the vehicle receives an operation command B for controlling said in-vehicle unit from a second state to a first state, said operation command B is executed only when control based on an operation command A for controlling said in-vehicle unit from the first state to the second state is made before the operation command B; and
   said vehicle comprises a remote operation response generating part that generates an operation completion notification after controlling the in-vehicle unit based on the operation command A.

2. The remote operation system as claimed in claim 1, wherein:
   said remote operation response generating part transmits the operation completion notification to the service center; and
   said remote operation response generating part transmits a cancel operation completion notification when the in-vehicle unit is controlled based on the operation command B and a state before the operation command A is returned to.

3. The remote operation system as claimed in claim 2, wherein:
   said operation completion notification comprises guiding information guiding a user to return the in-vehicle unit to the state before the control of the operation command A.

4. The remote operation system as claimed in claim 1, wherein:
when said vehicle has a control record of the in-vehicle unit based on the operation command A, said vehicle returns the in-vehicle unit into the state before the operation command A based on the operation command B.

5. The remote operation system as claimed in claim 1, wherein:
after control of the in-vehicle unit based on the operation command A, said vehicle returns the in-vehicle unit into the state before the operation command A based on the operation command B only during a predetermined time period.

6. The remote operation system as claimed in claim 1, wherein:
when said vehicle is locally controlled after control of the in-vehicle unit based on the operation command A, said vehicle inhibits returning of the in-vehicle unit into the state before the operation command A based on the operation command B.

7. The remote operation system as claimed in claim 1, wherein:
said vehicle has a flag for determining whether or not the state before the operation command A is to be returned to when the operation command B is received; and
said flag comes to have an allowable state when the in-vehicle unit of said vehicle is controlled based on the operation command A, and comes to have a not allowable state when said vehicle is locally controlled or a predetermined time period has elapsed from control of the in-vehicle unit based on the operation command A.

8. The remote operation system as claimed in claim 7, wherein:
said vehicle comprises a remote operation response generating part which transmits the flag together with an operation completion notification after controlling the in-vehicle unit based on the operation command A;
said remote operation response generating part transmits the flag together with a cancel operation completion notification when controlling the in-vehicle unit based on the operation command B and returns the in-vehicle unit to the state before the operation command A; and
said service center determines whether or not to accept the operation command B based on the state of the flag transmitted from the vehicle.

9. The remote operation system as claimed in claim 8, wherein:
said service center dispatches a cancel operation menu page from which the operation command B is selectable via the portable unit when the flag has the allowable state; and
said service center dispatches a cancel operation menu not displaying page from which the operation command B is not selectable via the portable unit when the flag has the not allowable state.

10. The remote operation system as claimed in claim 9, wherein:
said service center dispatches the cancel operation menu page to the portable unit when the flag of the vehicle is inverted into the not allowable state after the flag in the allowable state is transmitted from said vehicle.

11. The remote operation system as claimed in claim 8, wherein:
said service center updates the flag of the service center into the allowable state when said service center cannot properly receive the operation completion notification from said vehicle after transmitting the operation command B.

12. The remote operation system as claimed in claim 8, wherein:
said service center updates the flag into the not allowable state when a predetermined time period has elapsed from when the flag comes to have the allowable state.

13. The remote operation system as claimed in claim 12, wherein:
said service center transmits the operation command B to said vehicle even when the flag has the not allowable state, after dispatching the cancel operation menu page, in a case where the operation command B from the portable unit is received by the service center after said predetermined time period has elapsed.

14. A remote operation apparatus of a remote operation system, the remote operation system including the remote operation apparatus, an in-vehicle unit, a portable unit that is carried by a driver, and a service center, the remote operation apparatus controlling said in-vehicle unit based on an operation command transmitted from said portable unit via said service center, wherein:
when receiving an operation command B for controlling said in-vehicle unit from a second state to a first state, said operation command B is executed only when control based on an operation command A for controlling said in-vehicle unit from the first state to the second state is made before the operation command B; and
the remote operation apparatus includes a remote operation response generating part that generates an operation completion notification after controlling the in-vehicle unit based on the operation command A.

15. The remote operation apparatus as claimed in claim 14, wherein a said remote operation response generating part transmits the operation completion notification to the service center; and
said remote operation response generating part transmits a cancel operation completion notification when the in-vehicle unit is controlled based on the operation command B and a state before the operation command A is returned to.

16. The remote operation apparatus as claimed in claim 15, wherein:
said operation completion notification comprises guiding information guiding a user to return the in-vehicle unit to the state before the control of the operation command A.

17. The remote operation apparatus as claimed in claim 14, wherein:
when having a control record of the in-vehicle unit based on the operation command A, said apparatus returns the in-vehicle unit into the state before the operation command A based on the operation command B.

18. The remote operation apparatus as claimed in claim 14, wherein:
after control of the in-vehicle unit based on the operation command A, said apparatus returns the in-vehicle unit into the state before the operation command A based on the operation command B only during a predetermined time period.

19. The remote operation apparatus as claimed in claim 14, wherein:
when a vehicle of the remote operation system is locally controlled after the control of the in-vehicle unit based on the operation command A, said apparatus inhibits returning of the in-vehicle unit into the state before the operation command A based on the operation command B.

20. A service center of a remote operation system, the remote operation system including the service center, a portable unit, and an in-vehicle unit, the service center communicating an operation command between said portable unit and said in-vehicle unit, wherein:

said service center determines whether or not an operation command B is to be accepted, based on a status which indicates whether or not control of the in-vehicle unit based on an operation command A is made before the operation command B, which command A controls said in-vehicle unit from a first state into a second state, when said service center receives the operation command B controlling the in-vehicle unit from the second state into the first state.

21. The service center as claimed in claim 20, the service center receiving a flag indicating allowable or not allowable of the operation command B together with operation completion notification from a vehicle of the remote operation system after controlling the in-vehicle unit based on the operation command A;

the service center receiving the flag together with cancel operation completion notification when controlling the in-vehicle unit based on the operation command B and returning the in-vehicle unit to the state before the operation command A; and the service center determining based on the state of the thus-transmitted flag whether or not the operation command B is to be accepted.

22. The service center as claimed in claim 21, the service center dispatching a cancel operation menu page from which the operation command B is selectable via the portable unit when the flag has an allowable state allowing the cancel operation; and the service center dispatching a cancel operation menu not displaying page from which the operation command B is not selectable via the portable unit when said flag has a not allowable state.

23. The service center as claimed in claim 22, the service center dispatching the cancel operation menu page to the portable unit when the flag of the vehicle is inverted into the not allowable state after the flag in the allowable state is transmitted from the vehicle.

24. The service center as claimed in claim 21, the service center setting said status in an allowable state when the service center cannot properly receive the operation completion notification from the vehicle after transmitting the operation command A.

25. The service center as claimed in claim 21, the service center setting the status in a not allowable state when a predetermined time period has elapsed after said status comes to have the allowable state.

26. The service center as claimed in claim 25, the service center transmitting the operation command B to the portable unit even when the status is in the not allowable state after dispatching the cancel operation menu page, in a case where said service center receives the operation command B from the portable unit after said predetermined time period has elapsed.

* * * * *